United States Patent [19]
Hahn

[11] Patent Number: 5,648,712
[45] Date of Patent: Jul. 15, 1997

[54] UNIVERSALLY INTERCHANGEABLE AND MODULAR POWER SUPPLY WITH INTEGRATED BATTERY CHARGER

[75] Inventor: Stan S. Hahn, Moraga, Calif.

[73] Assignee: Asian Micro Sources, Inc., Moraga, Calif.

[21] Appl. No.: 521,113

[22] Filed: Aug. 29, 1995

[51] Int. Cl.[6] .................................................. H01M 10/46
[52] U.S. Cl. .......................................... 320/2; 439/170
[58] Field of Search ........................... 320/2, 5; 439/131, 439/170, 171, 172, 173, 174, 175, 221; D13/107, 108; 455/89, 90

[56] References Cited

U.S. PATENT DOCUMENTS

| | | | |
|---|---|---|---|
| D. 314,173 | 1/1991 | Soren et al. | D13/108 |
| D. 324,024 | 2/1992 | Nagele et al. | D13/108 |
| D. 331,220 | 11/1992 | Tsuchiya | D13/107 |
| D. 350,113 | 8/1994 | Nagele | D13/110 |
| 1,485,193 | 2/1924 | McKay | 439/131 |
| 1,742,850 | 1/1930 | Douglas | 439/314 |
| 2,490,580 | 12/1949 | Colla, Jr. | 439/131 X |
| 2,538,296 | 1/1951 | Crocker | 439/131 X |
| 4,191,917 | 3/1980 | Brown et al. | 439/173 X |
| 4,515,872 | 5/1985 | Okano | 429/99 X |
| 4,518,212 | 5/1985 | Rumble | 439/221 X |
| 4,543,624 | 9/1985 | Rumble | 439/173 X |
| 4,626,052 | 12/1986 | Rumble | 439/173 |
| 4,677,654 | 6/1987 | Lagin et al. | 379/58 |
| 4,709,201 | 11/1987 | Schaefer et al. | 320/2 |
| 4,743,829 | 5/1988 | Fenne et al. | 439/131 X |
| 4,829,224 | 5/1989 | Gandelman et al. | 320/2 |
| 4,881,258 | 11/1989 | Kaiwa et al. | 379/58 |
| 4,911,649 | 3/1990 | Helmich, Jr. | 439/172 X |
| 4,916,729 | 4/1990 | Usui | 379/58 X |
| 4,962,523 | 10/1990 | Tanaka | 379/58 X |
| 4,973,827 | 11/1990 | Nozaki | 439/173 X |
| 4,977,042 | 12/1990 | Chiyajo et al. | 320/2 X |
| 4,997,381 | 3/1991 | Oh | 439/131 X |
| 5,020,090 | 5/1991 | Morris | 379/58 |
| 5,036,532 | 7/1991 | Metroka et al. | 379/58 |
| 5,095,541 | 3/1992 | Aisaka et al. | 455/89 |
| 5,121,047 | 6/1992 | Goedken et al. | 320/39 |
| 5,122,722 | 6/1992 | Goedken et al. | 320/22 |
| 5,136,229 | 8/1992 | Galvin | 320/2 |

(List continued on next page.)

FOREIGN PATENT DOCUMENTS

7600749  8/1976  Netherlands .......................... 439/221

OTHER PUBLICATIONS

"Panasonic VCR Manual," page 3, Aug. 1992.

*Primary Examiner*—Edward Tso
*Attorney, Agent, or Firm*—Adam H. Tachner; Nathan P. Koenig; Crosby, Heafey, Roach & May

[57] ABSTRACT

An integrated power supply and battery charger with interchangeable and collapsible plug capacity and interchangeable power input modules includes a casing, an electrical plug detachably mounted in the casing and including collapsible prongs, allowing the user to accommodate myriad combinations of power source configurations, electrical devices and rechargeable batteries therefore and to power and charge same in a safe and convenient manner. A cradle accommodates a battery to be charged. Releasable locking mechanisms are included to both engage the interchangeable electrical plug and battery and to lock the collapsible prong in the extended position. The locking mechanisms can be released by a user to allow the plug or battery to be moved to the detached position. A preferred form of electrical connection between a detachable plug and casing comprises a submerged pin and sleeve configuration to protect the user or passerby from electric shock. A preferred form of conducting prong is collapsible within the carrier and is securable in an extended position to avoid inadvertent collapse. A variety of interchangeable electrical plugs can be fitted to the same casing. A power supply is preferably fitted within the casing, allowing an electrical device to be attached to the device while the device is also acting as a battery charger. A collapsible stand is provided to enable the user to easily utilize both the battery charging and power supplying abilities of the inventive device in tandem.

10 Claims, 18 Drawing Sheets

U.S. PATENT DOCUMENTS

| | | |
|---|---|---|
| 5,151,643 | 9/1992 | Emmert et al. ................................ 320/2 |
| 5,159,256 | 10/1992 | Mattinger et al. ............................ 320/2 |
| 5,159,545 | 10/1992 | Lee ..................................... 439/173 X |
| 5,160,879 | 11/1992 | Tortola et al. ............................... 320/2 |
| 5,162,719 | 11/1992 | Tomura et al. .............................. 320/2 |
| 5,185,566 | 2/1993 | Goedken et al. .......................... 320/48 |
| 5,212,836 | 5/1993 | Matsushita ............................ 379/58 X |
| 5,213,516 | 5/1993 | Okamoto .............................. 439/171 X |
| 5,256,955 | 10/1993 | Tomura et al. .............................. 320/2 |
| 5,317,247 | 5/1994 | Chong et al. ................................ 320/2 |
| 5,327,067 | 7/1994 | Scholder ...................................... 320/2 |
| 5,333,176 | 7/1994 | Burke et al. ................................ 379/58 |
| 5,335,261 | 8/1994 | Fujinaka ..................................... 379/58 |
| 5,335,263 | 8/1994 | Tsunehiro et al. ........................ 379/58 |
| 5,347,208 | 9/1994 | Iida ............................................... 320/2 |
| 5,363,030 | 11/1994 | Ford et al. ................................. 320/13 |
| 5,367,556 | 11/1994 | Marui et al. ............................... 379/58 |
| 5,369,803 | 11/1994 | Hirasawa et al. ......................... 455/89 |
| 5,423,690 | 6/1995 | Selker et al. ............................. 439/172 |

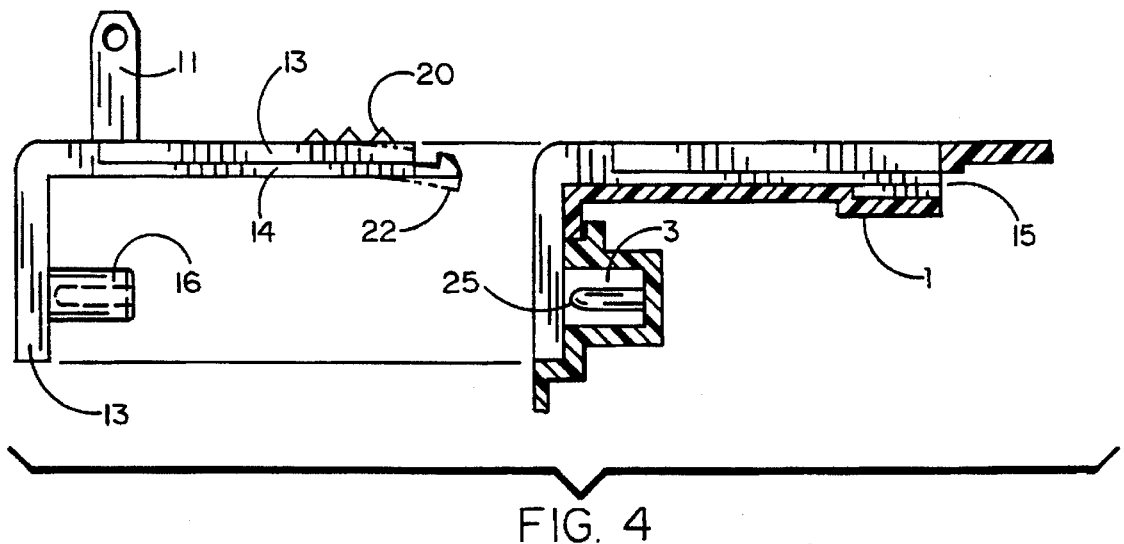
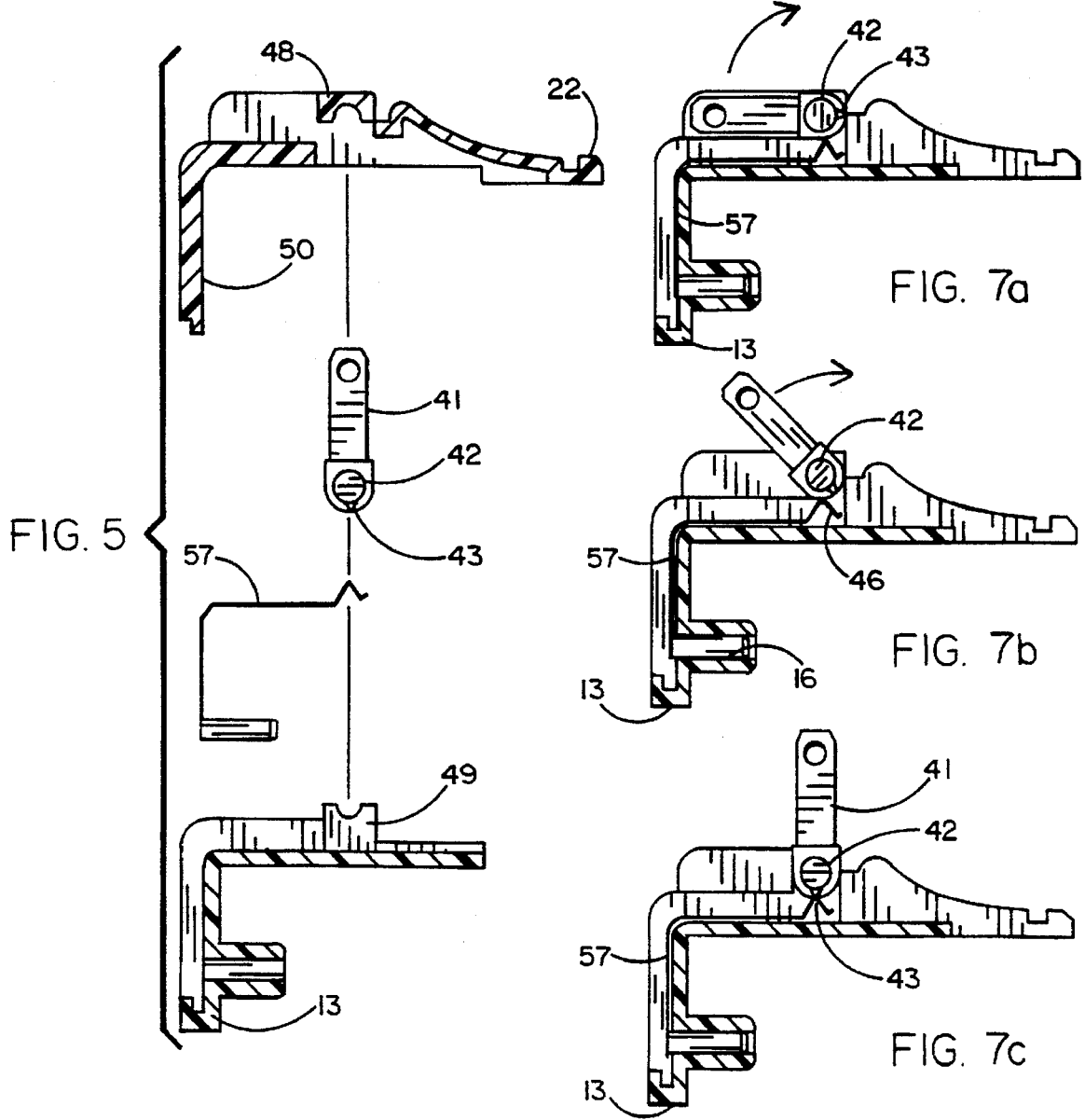

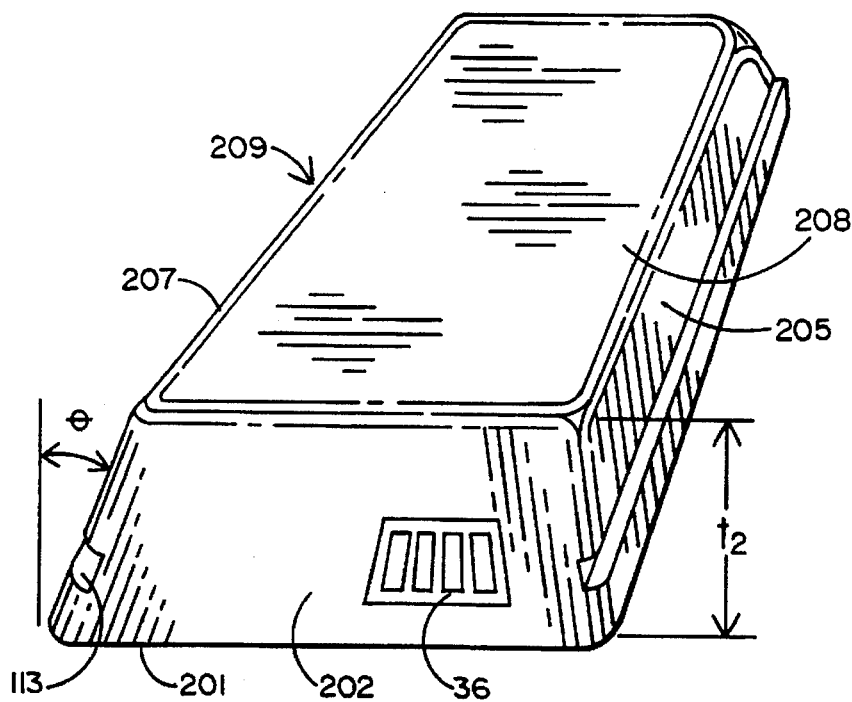
FIG. 10c
PRIOR ART
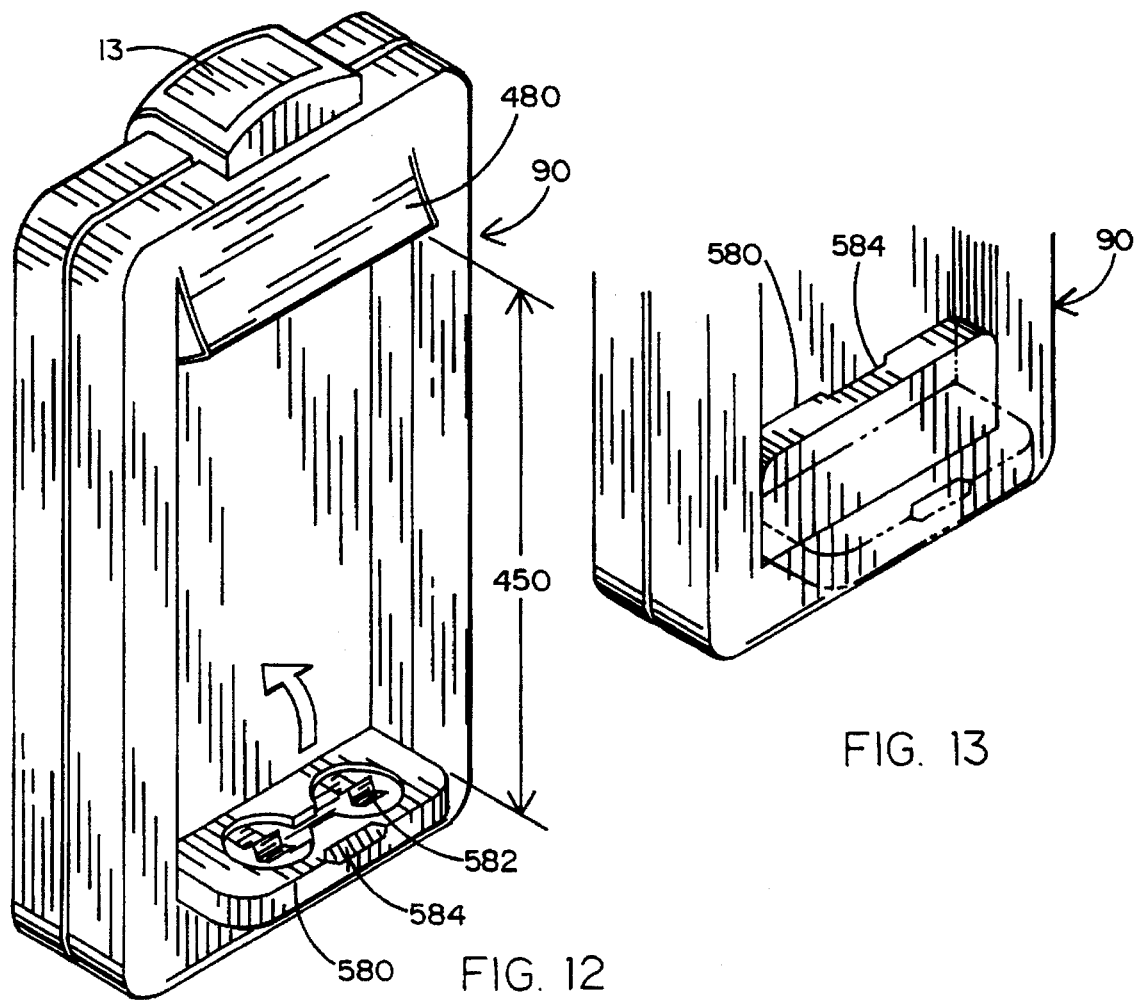
FIG. 12
FIG. 13

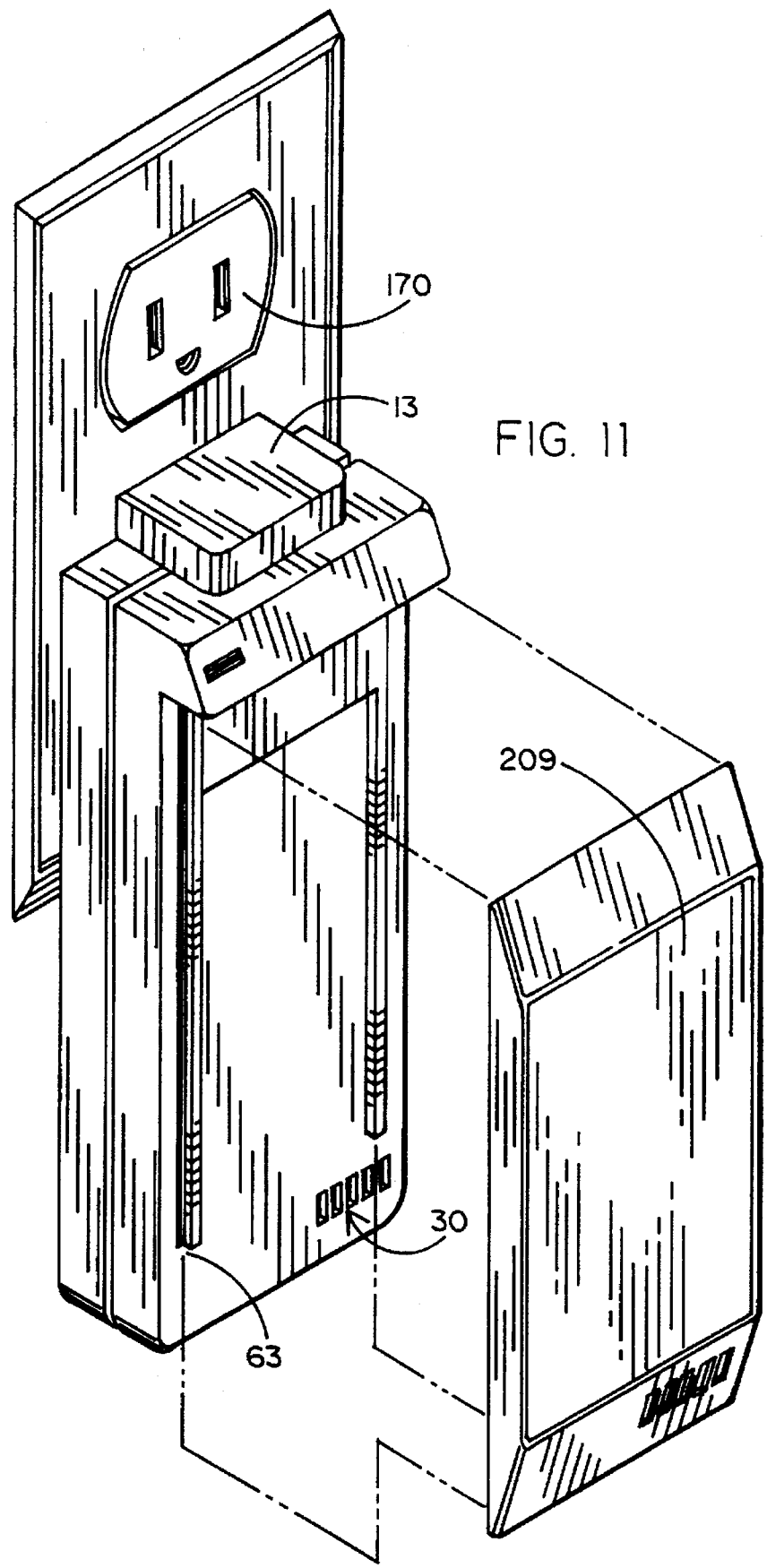

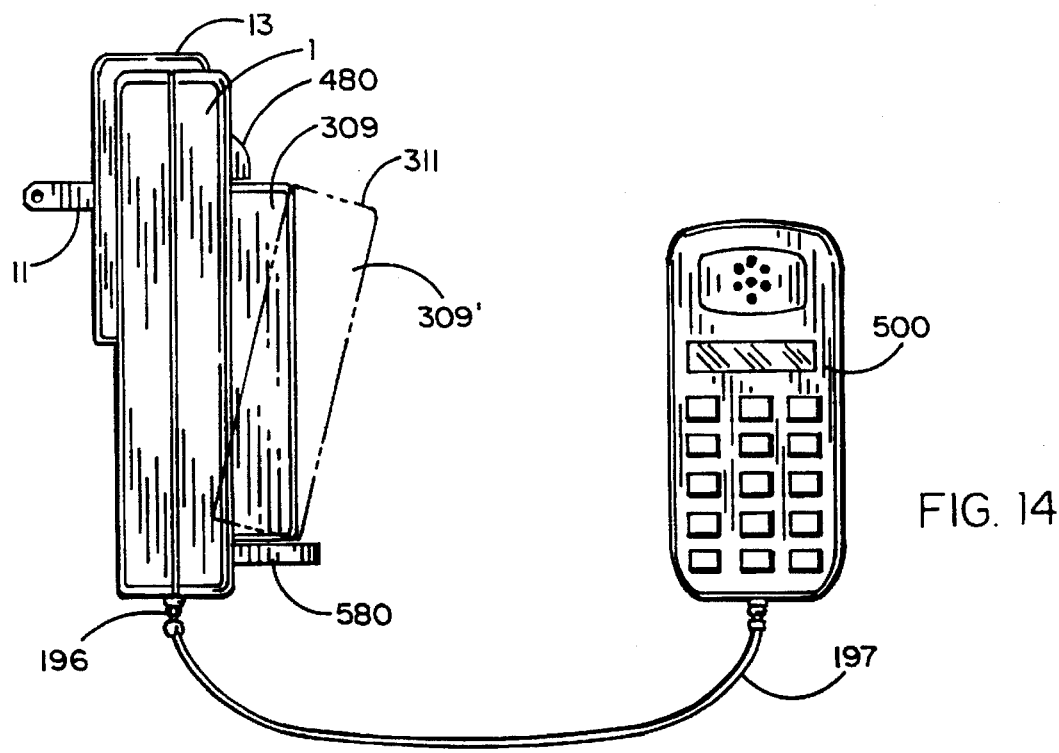
FIG. 14
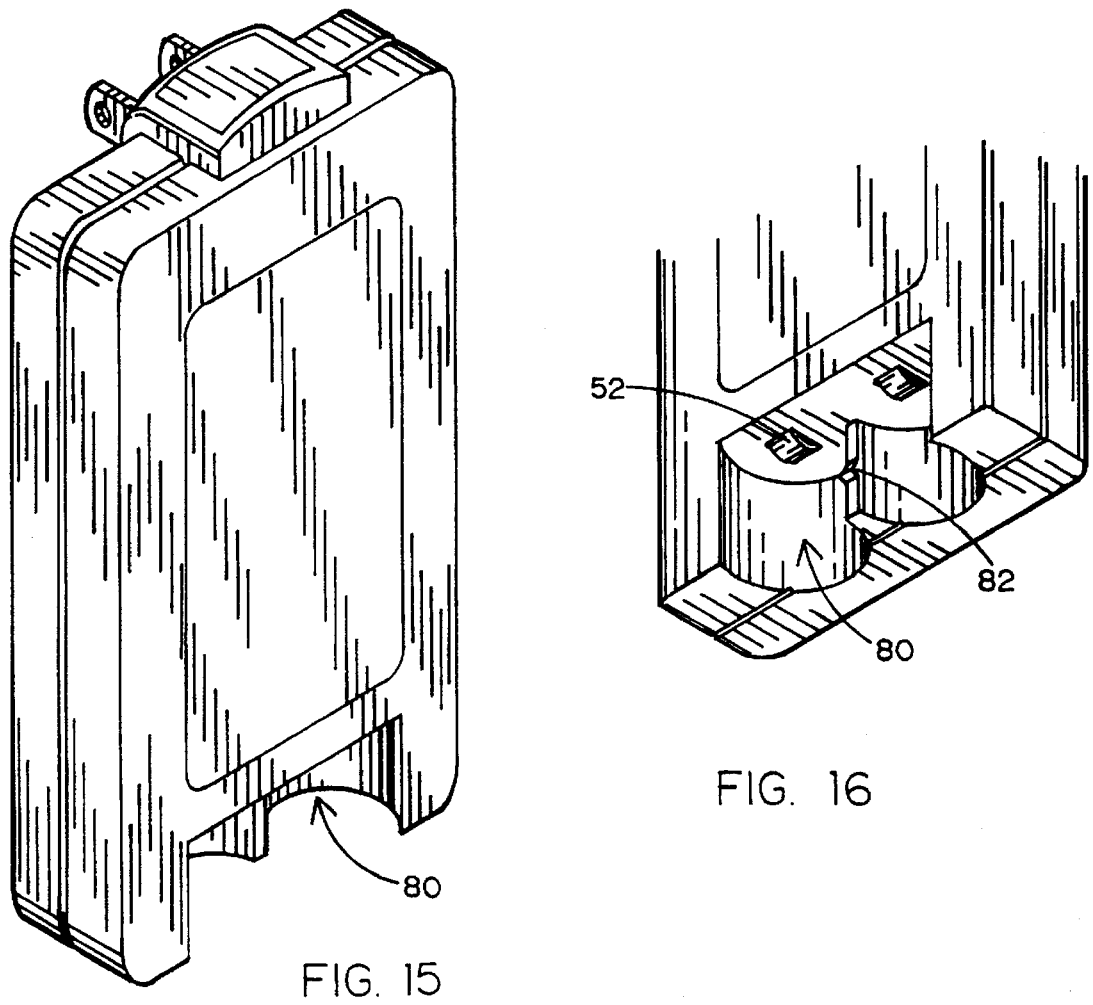
FIG. 15
FIG. 16

UNIVERSALLY INTERCHANGEABLE AND MODULAR POWER SUPPLY WITH INTEGRATED BATTERY CHARGER

FIELD OF THE INVENTION

The present invention relates generally to power supplies and battery chargers and more particularly to integrated battery charger power supplies which can be disassembled and collapsed for convenient transportation or storage and are adaptable to the varying electrical and physical characteristics of electrical devices and outlets in various parts of the world.

BACKGROUND OF THE INVENTION

Mobile electrical devices such as cellular phones often employ rechargeable batteries which, due to weight and size constraints, require frequent recharging. While many battery charger designs exist, all available designs fail to meet at least one of the many challenges facing the designer of the fully integrated battery charger and power supply for worldwide mobile use.

A first challenge arises from the multi-level power demands of some electrical devices. For example, available cellular phone and notebook computer batteries require a certain power input to be charged, while the phones or computers themselves require another input level to be powered directly. This problem is accentuated for the user who wishes to utilize a mobile electronic device in a truly mobile environment such as a car or boat, which normally supplies only dc power and often subjects the device to extreme vibration for extended periods of time. While various adaptors and conversion circuits are available which can make most small electrical devices run in a truly mobile environment, such add-on devices can quickly become burdensome for the traveler who wishes to minimize the effect of the vibration in the mobile environment and the baggage associated with achieving true electronic mobility.

A second design challenge arises from the desire of many users to continue using their electrical device while charging a battery which may or may not be connected to the device. This challenge was addressed with some success by Weiss, et al., as disclosed in U.S. Pat. No. 5,059,885, assigned to Motorola, Inc. and incorporated by reference herein in its entirety. Weiss is directed to a battery charger housing including a battery positioning and support apparatus. However, available commercial embodiments of the apparatus disclosed in Weiss require an external power supply to power an internal battery charging circuit, thereby adding to the complexity and burden of using the available apparatus. Moreover, while the apparatus disclosed in Weiss can accommodate batteries of varying sizes, gravity is the only means disclosed in Weiss for maintaining the batteries in a charging position. Thus, the apparatus disclosed in Weiss may prove less than optimal in a truly mobile environment, such as a boat or car, wherein the charger may not remain level throughout an unsupervised charging session. Finally, the user of the Weiss apparatus must detach a charging battery or electrical device attached thereto from the charger housing to use the battery or device.

One available and very popular battery charger and power supply for cellular telephones, marketed by Motorola, Inc., incorporates a dual use stand similar to the stand disclosed by Weiss, wherein a phone and battery can be placed and separately charged and powered. However, this design remains dependent upon an external power supply, requires the user to detach the electronic device to make use of it, and fails to address the security requirements necessary for a design compatible with the truly mobile environment.

Another challenge in charger design arises from the fact that while many electrical devices are sold for use throughout the world, there is no world standard for electrical plug configurations, size, shape, position or number of prongs. The wide variety of socket configurations in use worldwide burdens international suppliers of mobile products to varied countries and international travelers who wish to use electrical devices in a portable fashion.

Most industrial nations use a standardized alternating current supply with a hot side and a neutral side. Some plugs specifically incorporate a separate earth or ground lead while others do not. A problem exists, therefore, with physically accessing an AC current source supplied through any number of outlet configurations and interfacing that current source with the appropriate input connections for the power supply and/or battery charger as well as with the device to be powered and/or the battery to be charged.

The traditional solution for the mechanical prong configuration problem is to provide an adapter which includes a socket to accommodate the prongs of the electrical device integrated with a second set of prongs in a configuration for a local socket. These adapters suffer from some significant problems. The most significant problem is that the adapters are bulky and at a minimum cause the prongs of the original device to be extended by at least the length of the additional set of prongs. Since most plug devices are designed to be secured by spring tension and interaction with a wall plug, this can pose a significant mechanical disadvantage. The increased lever arm created by the additional prong length will tend to shift the plug downward, tending to pry the plug out of the wall socket. This will be true even for a light weight plug.

The lever arm problem is accentuated with devices that are larger than a simple plug. Many battery chargers and power supplies are designed to be wall-mounted at a wall socket. A typical device includes a casing which terminates in a plug designed to plug directly into the wall socket. The casing is often designed to lie against a wall to provide mechanical stability and to maintain the plug prongs in proper contact with the wall socket. If an adapter must be used, the unit loses the stability of resting against the wall and, because even a small amount of weight at the end of a lever arm will create a torque which will tend to pry the prongs out of the wall socket, such a plug adapter is generally unusable for such wall-mounted plug-in devices. Also, sometimes plugs are situated on a wall or surface in such a manner that the device cannot be adequately secured near the wall, in which case a flexible unit which can be used in either a wall mount or a surface-top configuration is required.

Angling the plug severely can compromise the electrical connection to the point that the plug no longer is in electrical contact with source current. This type of angling may lead to partial separation from the wall socket and may expose the prongs of the plug in such a way that a person or animal might come into contact with live current, thereby causing bodily harm.

A further problem with existing plugs is the awkward shape of the plug with prongs protruding from the end. If, for example, a plug is moved from location to location, the prongs of the plug extend outward and can be difficult to pack or store or can catch on clothing when packed into a travel case.

A few plug devices have been designed with a plug or prongs which fold into a casing. For example, some rechargeable flashlights include the collapsible prongs which can be rotated into a position extending out from the body of the flashlight and plugged directly into a wall socket or extension cord. In another example, some telephone charging stations include a cradle for the telephone and a rotatable plug which can be extended into position for plugging into a wall socket, or collapsed into a space in the shell of the charging station, particularly so that a user may slip a charging station into a pocket, a briefcase, or other container.

Presently available collapsible plug devices suffer from various problems which make them inconvenient or even dangerous to use. In particular, the rotatable plug has only a weak spring holding the plug in position. It does not take much effort to collapse the plug, which may cause the plug to partially or completely pull out of a wall socket. This can compromise the electrical connection to the point that the plug no longer is in electrical contact with source current. In some circumstances, this may expose the prongs of the plug in such a way that a person, might come into contact with live current, thereby causing bodily harm. In addition, a collapsing plug might pinch the user.

Accordingly, for the mobile user there is a need for a charging device which can be-flexibly incorporated into a variety of work environments, which can supply charging power from a variety of AC and DC electricity sources in known international configurations, which can charge batteries without monopolizing use of the battery-powered device benefitting from the charge, which enables the user to continue using the device while the device receives power from the charger, and which can directly power the device, all in an easy to use and compact package.

SUMMARY OF THE INVENTION

The present invention overcomes these problems by providing a universally interchangeable and modular power supply and integrated battery charger which can be securely utilized in a mobile environment or conveniently used as an everyday, convenient substitute for existing devices. The invention accommodates most internationally known physical and electrical configurations for supply power. The plug prongs of the inventive device are maintained in an extended position but may be folded easily to a compact, collapsed position for easy travel. This collapsible prong feature is incorporated within an interchangeable plug device which can be designed for use in a variety of configurations and still provide the mechanical advantages of fitting closely to the socket and, generally, against a wall. Moreover, the inventive device provides a safe means for drawing current from an interchangeable plug while minimizing the risk of exposure to a live prong or connector.

To these ends, the present invention comprises an interchangeable plug battery charger and power supply including a casing, an electrical plug detachably mounted in the casing and movable between a detached and an engaged, operative position, and a releasable locking means mechanically connected to the casing and designed to engage the electrical plug to maintain the plug in an operative position. The locking means can be released by a user to allow the plug to be moved to the detached position.

In a preferred embodiment, a power supply is provided within the casing so that a rechargeable device can be attached to the battery charger and plugged directly into an ac or dc electrical power source.

A preferred form of locking mechanism is a depressible lock bar which is designed to engage a detent in the casing.

The depressible lock bar is connected to or integral with an electrical plug body. A preferred form of electrical connection between the combined battery charger and power supply and the electricity source is a plurality of submerged pins and sleeves which protects the user against exposure to live current if an interchangeable plug or cord becomes disconnected from a device while the plug or cord is secured to a live electrical socket.

Accordingly, it is an object of this invention to provide an integrated battery charger and power supply including an interchangeable plug device and the ability to simultaneously accomodate a battery for charging and powering an electrical device.

Another object of this invention is to provide a plurality of interchangeable plug and cord devices designed to connect to or integrate with a compatible carrier which can be mechanically and electrically connected to an electrical device.

A further object of this invention is provide a means for securing and electrically connecting an interchangeable plug or cord with a compatible carrier in a manner which provides optimal user safety.

Yet another object of the present invention is to provide a collapsible prong plug device compatible with an integrated battery charger and power supply which can fold into an inoperative position for convenience in transportation of the plug and charger/power supply.

BRIEF DESCRIPTION OF THE DRAWINGS

FIG. 4 illustrates a cross-section of the device, showing the plug body and carrier ready to be connected to the device.

FIG. 5 provides an exploded view of an interchangeable plug including the collapsible prong feature included in the present invention.

FIGS. 7A, 7B and 7C illustrate a cross-section of the device showing the plug body and carrier with the prongs in a fully collapsed position (7A), partially extended position (7B), and fully extended position (7C).

FIGS. 10A, 10B and 10C provide views of various batteries compatible with the inventive charger unit of the present invention.

FIG. 11 provide a perspective view of the inventive charger and power supply attached to an electrical outlet and adjacent an attachable battery.

FIG. 12 illustrates a second embodiment of the inventive battery cradle feature of the present invention.

FIG. 13 provides a close-up view of a battery placed within the cradle of FIG. 12.

FIG. 14 provides a side view of the cradle of FIG. 12.

FIG. 15 provides another embodiment of the cradle feature of the present invention.

FIG. 16 provides a close-up view of the cradle feature shown in FIG. 15.

DETAILED DESCRIPTION OF THE PREFERRED EMBODIMENTS

The inventive and highly modular device of the present invention includes a casing, a plug mounted to the casing, a cradle for mounting a battery on the casing, locking devices to secure the mounted plug and battery, and a plurality of electrical contacts and receptacles for electrical communication between modular electrical inputs and outputs designed for a variety of electrical sources and destinations. The specific shape of the casing can be modified in many ways to accommodate specific design needs. The plug can also be modified to accommodate specific design needs, including the number and configuration of electrical prongs to adapt to a variety of standard, electrical outlets. The drawings illustrate a representative device but one skilled in the art will recognize that a variety of devices can be designed and manufactured, which are encompassed by the teachings of this invention.

Figure 1A:
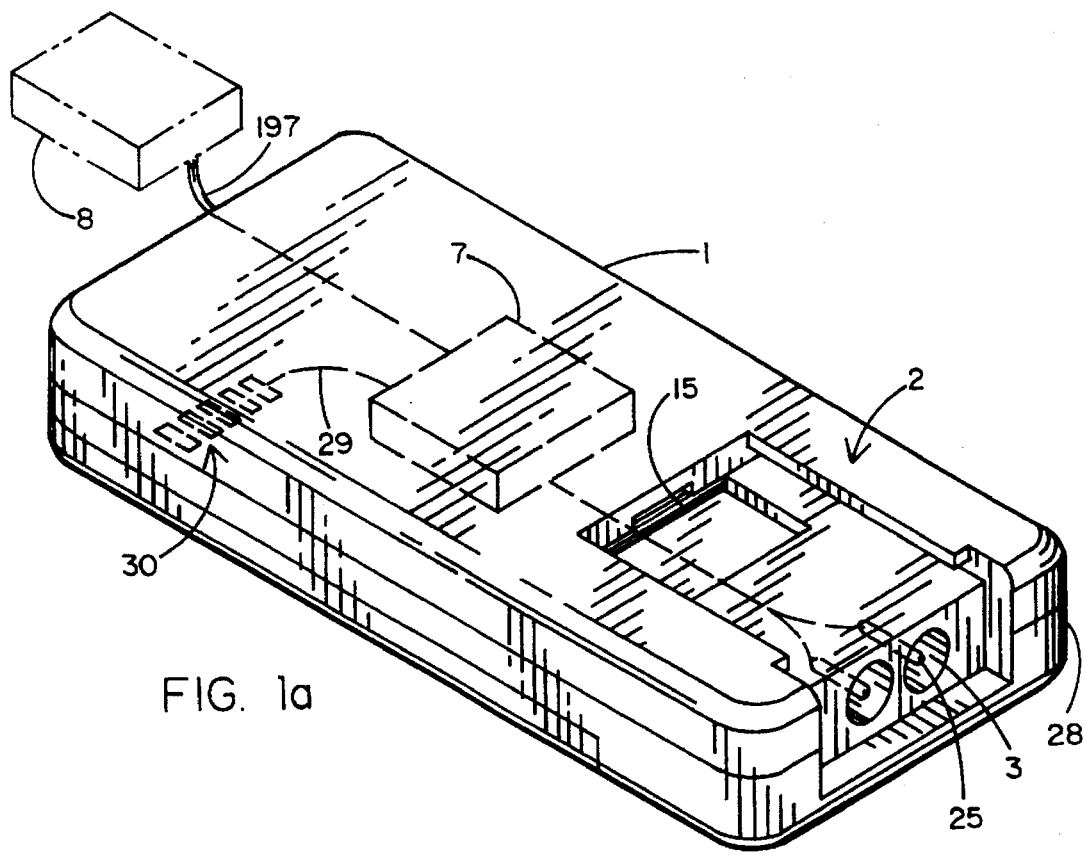
FIGS. 1A, 1B, 1C, 1D and 1E illustrate a perspective view of the interchangeable plug feature of the present invention, showing several interchangeable plugs positioned to be moved to an operative position in the inventive charger and power supply unit.
Figure 1B:
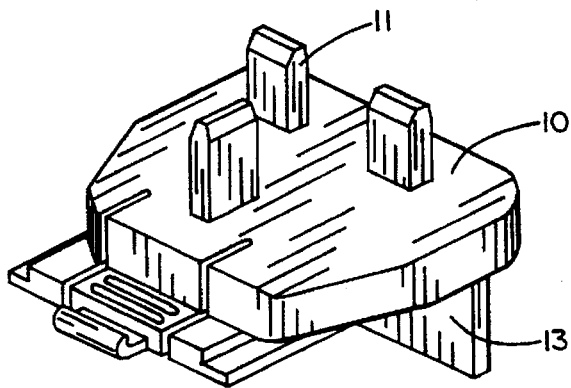
Figure 1C:
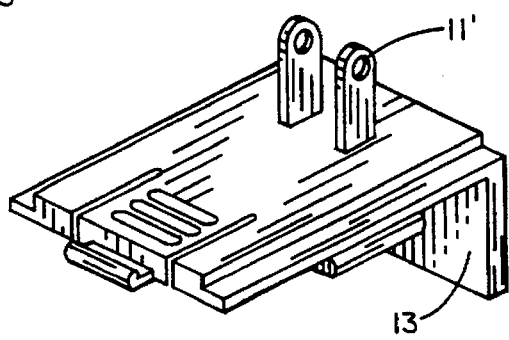
Figure 1D:
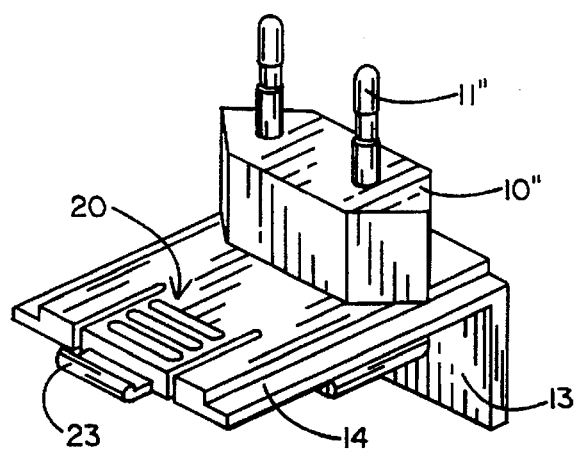
Figure 1E:
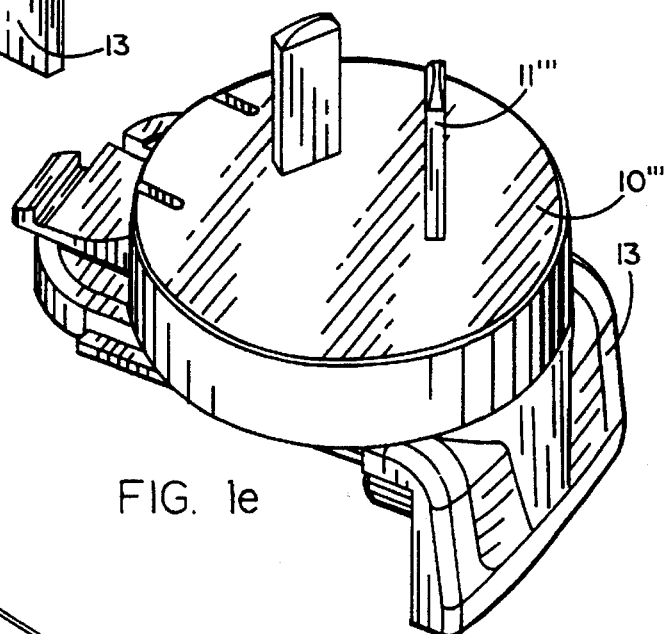

Referring to FIGS. 1A, 1B, 1C, 1D and 1E, casing 1 includes cavity 2 with channels 28 which are designed to accommodate any one of the carriers 13 depicted in the figures with tongues 14. FIG. 1B illustrates a carrier designed for the United Kingdom, FIG. 1C for the United States, FIG. 1D for Europe, and FIG. 1E for Australia. Plug characteristics for other countries, such as South Korea, can easily be integrated into the present invention. Similarly, opening 3 with submerged conducting pins 25 are designed to accommodate conducting sleeves 16. In a preferred embodiment, casing 1 is preferably made of high impact thermoplastic material, with top and bottom halves which can be sealed together by ultrasonic bonding.

Referring to FIG. 4, carrier 13 is connected to or integral with prongs 11. Each conducting sleeve 16 within carrier 13 is electrically connected to one prong 11 and is designed to mate with a corresponding conducting pin 25 positioned in cavity 3.

In one embodiment, shown in FIG. 1A, power supply 7, preferably a switching power supply contained on a printed circuit board, receives input power from conducting pins 25. Power supply 7 selectively forwards power to at least two destinations: through electrical cable 197 to an electrical connection means such as power adapter plug 199, which can in turn be connected to an electronic device 8, and through electrical connections means 29 to battery charging contacts 30, shown more clearly in FIG. 9.

Figure 2:
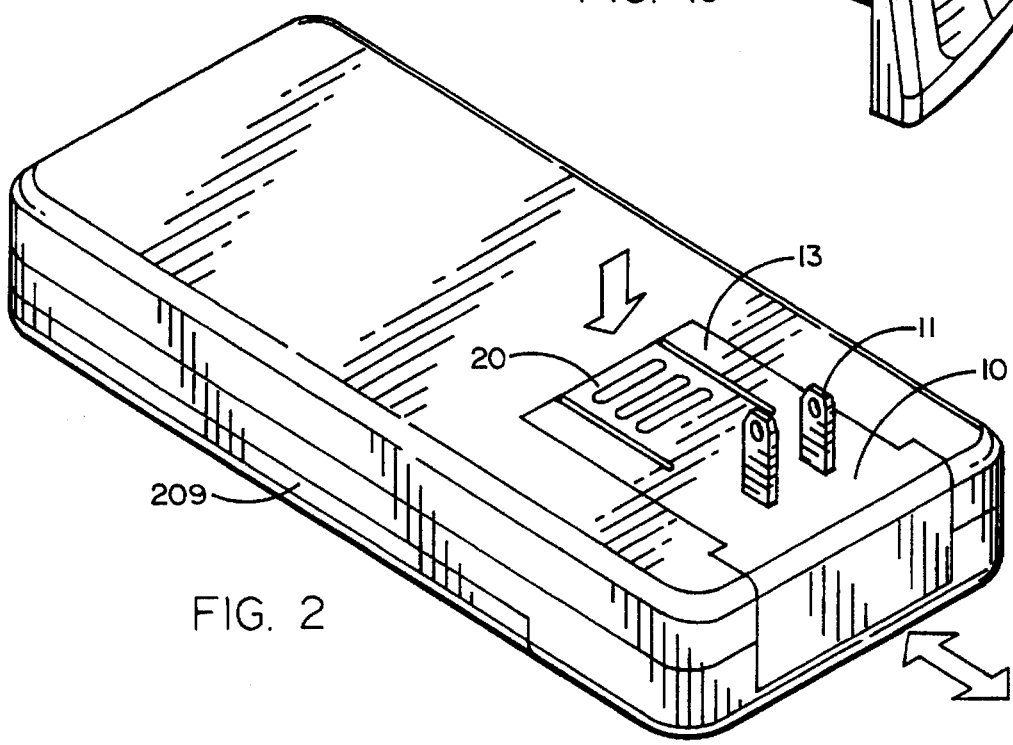
FIG. 2 illustrates a perspective view of the inventive charger and power supply unit, including the interchangeable plug feature, showing a representative interchangeable plug in an operative position.

FIG. 2 provides an isometric profile and FIG. 4 illustrates a cutaway view of the interchangeable plug feature of a preferred embodiment of the inventive charger and power supply. Casing 1 includes various features to support and position various components of the device. Carrier 13 is a generally rectangular element with a tongue 14 along each of two sides. Detent 15, shown in greater detail in FIG. 3A, is cut into casing 1.

Figure 3A:
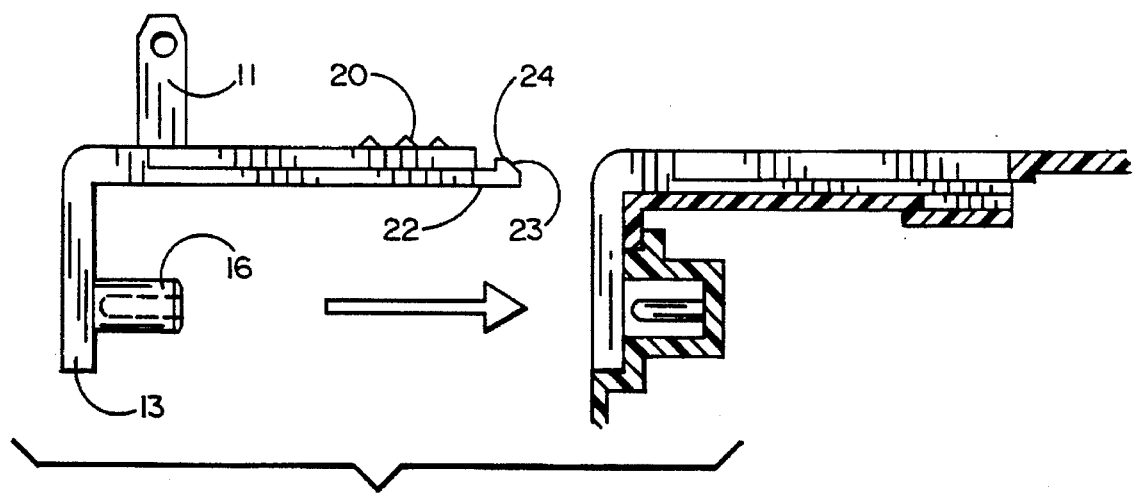
FIGS. 3A, 3B and 3C illustrate a cross-section of the device, showing a removable plug body and carrier ready to be connected to the device (3A), connected (3B) and released and ready to be detached (3C).
Figure 3B:
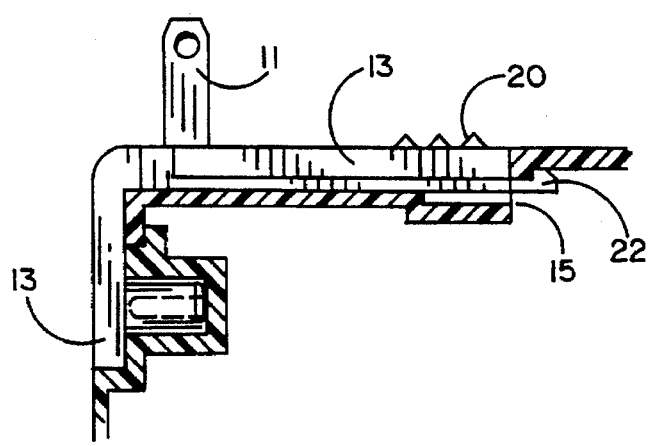
Figure 3C:
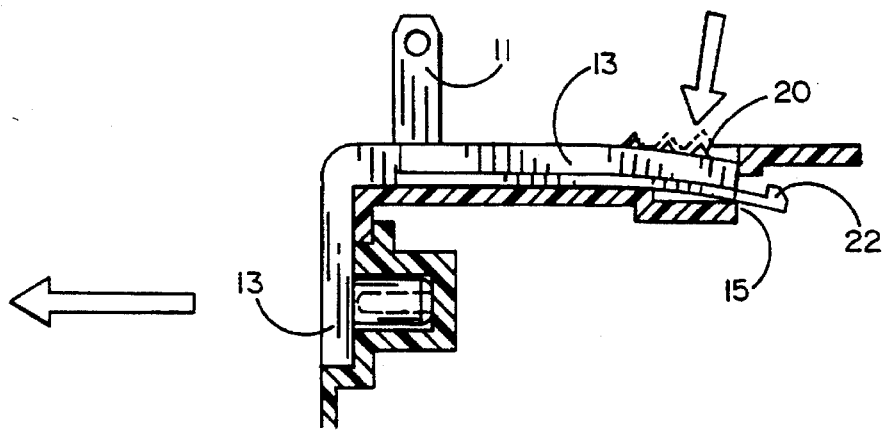

FIGS. 3A, 3B and 3C show lock bar 22 deformably positioned within casing 1. Lock bar 22 is made of a suitable material, such as a plastic material, which is resilient, tends to return to a preferred position, and can be secured at one end and be bent repeatedly to perform the needed release function yet return to a resting position with enough tension to perform the needed latch function. Lock bar 22 is preferably formed integral with carrier 13 and more specifically is preferably integrally formed with tongues 14. Release button 20 is connected to or preferably integral with lock bar 22. Lock bar 22 includes latch 23 and latch tip 24, which are designed to engage detent 15 in casing 1.

When carrier 13 and casing 1 are integrated into a singular unit, lock bar 22 is pressed against casing 1 by the nature tension and resilience of lock bar 22. To release the carrier 13 from the casing 1, release button 20 is depressed, which moves lock bar 22 away from casing 1 and latch 23 and latch 24 away from detent 15. Carrier 13 can then be disengaged from casing 1.

Detent 15 is shaped to accommodate the configuration of latch 23 and latch tip 24. In a preferred embodiment, latch 23 is angled as shown to provide a conventional catch mechanism.

Detent 15 includes base 15A which may be generally flat or angled to accommodate latch 23. Detent 15 also includes side 15B which is designed to accommodate and mechanically couple with latch 23 and latch tip 24. Detent 15 may, instead, have two parallel sides on either side of base 15A.

The pressure of lock bar 22 against casing 1 at detent 15 will maintain carrier 13 in the operative position until a user activates release button 20, moving it from the resting position shown in FIG. 3B to a released (depressed) position 20' shown in FIG. 3C. Once the release button is moved and latch tip 24 is removed from detent 15 at least far enough so that carrier 13 can slide freely, the user can move carrier 13 away from casing 1. Although conducting sleeves 16 may remain hot electrical leads after carrier 13 is removed, a user or passerby is protected from inadvertent contact with the conducting pins by their submerged position relative to the carrier 13.

This invention further includes a securing means and a release mechanism integrated into the casing. The plug's prong layout can be modified to accommodate specific design needs, including the number and configuration of electrical prongs to adapt to a variety of standard electrical outlets. FIGS. 1–4 illustrate a representative device, but one skilled in the art will recognize that a variety of devices can be designed and manufactured which are encompassed by the teachings of this invention. A number of additional features of the interchangeable plug element of the present invention are disclosed in copending U.S. patent application Ser. Nos. 08/201,397, filed Feb. 24, 1994, 08/233,125, filed Apr. 26, 1994, and 08/414,209, filed Mar. 30, 1995, incorporated herein in their entireties by reference.

Referring to FIG. 5, an exploded view of carrier 13 including the collapsible prong feature of the present invention is shown. Cover plate 50 including lock bar 22 integrally formed therewith, is connected to carrier 13, preferably by ultrasonic bonding. Encased between cover plate 50 and carrier 13 are collapsible prongs 41 integral with pivot pin 42. Pivot pin 42 rests between upper half-axis 48 and lower half-axis 49. Securing contact spring 45, preferably integral with connecting line 57, sits between collapsible prongs 41 and carrier 13 and comes into electrical communication with contact portion 43 of prong 41 when the collapsible prong is raised to the operative position. There is preferably at least one securing contact spring for each prong contact 43. Thus, for the embodiment shown there are two securing contact springs 45.

Figure 6:
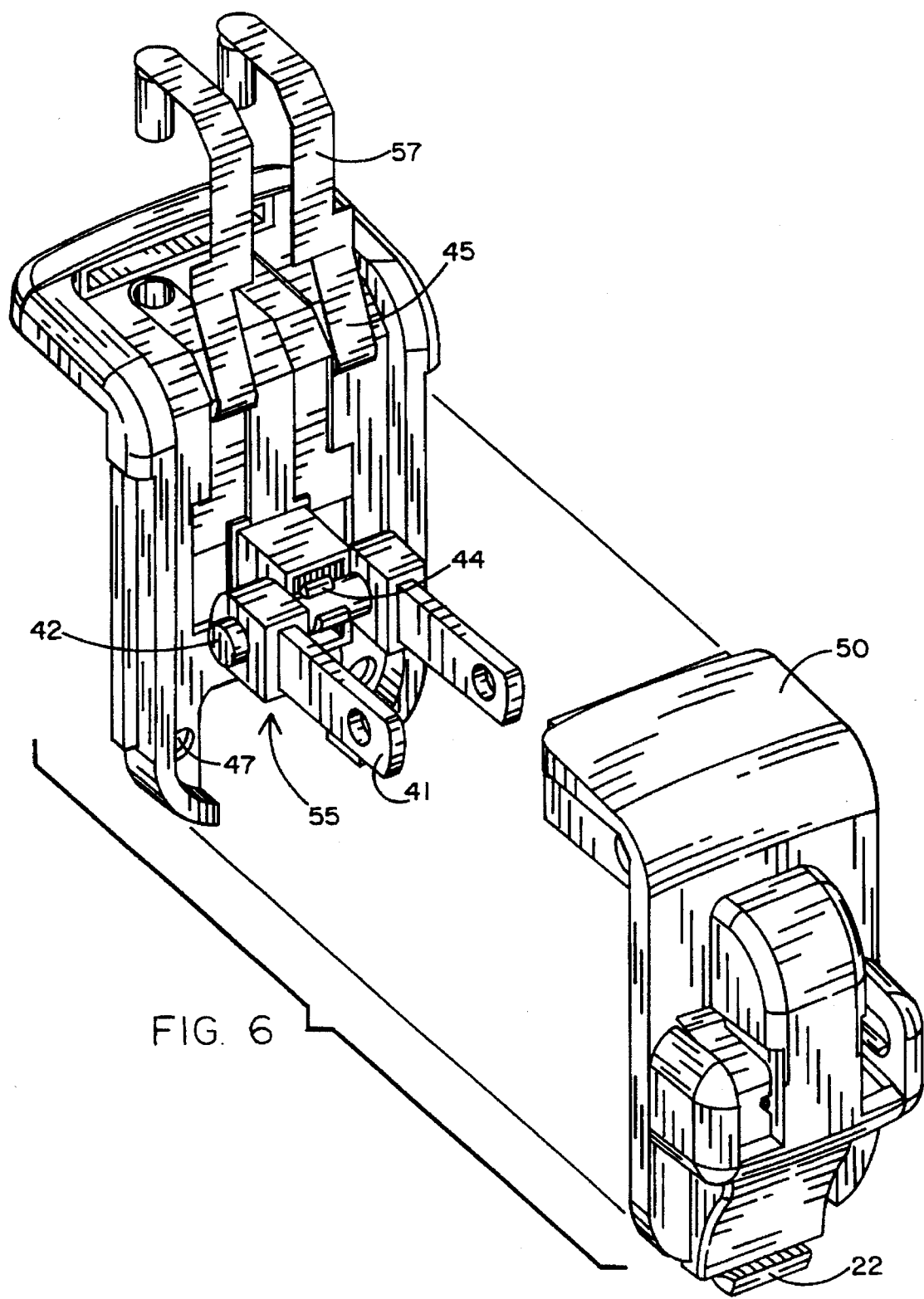
FIG. 6 provides an isometric exploded view of the inventive feature shown in FIG. 5.

FIG. 6 provides a more detailed exploded view of the present invention. Male connectors (not shown) on cover plate 50 are designed to align with female connectors 47. Gap 55 is formed in carrier 13 to accommodate movement of integral lock bar 22 in cover plate 50.

FIGS. 7A, 7B and 7C illustrate cut-away, side views of a preferred embodiment of the new device. Carrier 13 includes connecting lines 57, integral with contact springs 45 and conducting sleeves 16, and placed in electrical communication with each of collapsible prongs 41 via contact 43. Collapsible prongs 41 are mated with pivot pin 42. Integral with pivot pin 42, cams 44 (shown in FIG. 6) sustain an offset force from lower half-axis 49 when the prongs are extended. Referring to FIG. 7B, as collapsible prongs 41 are raised, contacts 43 engage rises 46 in securing contact springs 45, thereby causing a electrical communication therebetween. Simultaneously, as collapsible prongs 41 reach their full upright and extended position, cams 44 fully engage half-axis 49 and are frictionally engaged therewith. An electrical connection is thereby created from collapsible prongs 41 through contacts 43 to securing contact springs 45, to wires 57 and to conducting sleeves 16.

If desired, a single cam could be placed on pivot pin 41 with a single securing contact spring 45 positioned nearby to provide resistance via rise 46 and electrical contact with conducting sleeves 16.

A typical collapsible prong plug includes two or three prongs 41. The figures illustrate a typical American plug, but the same teachings and principles can be applied to design and use collapsible prong plug devices for British, European, Australian or other plugs, as shown in FIGS. 1–4.

The pressure of securing contact springs 45 on contacts 43 and of cam 44 on half-axis 49 will maintain collapsible prongs 41 in the extended position until a user forces the prongs from the extended position shown in FIG. 7C to the collapsed position shown in FIG. 7A. The user must apply sufficient force to move each contact 43 over rise 46, thereby increasing the resistant force of each securing contact spring 45. As contacts 43 of prongs 41 disengage securing contact springs 45, electrical contact is broken. Once the contacts 43 have passed rises 46 and are free of securing contact springs 45, the user can move prongs 41 to the collapsed position.

Figure 8:
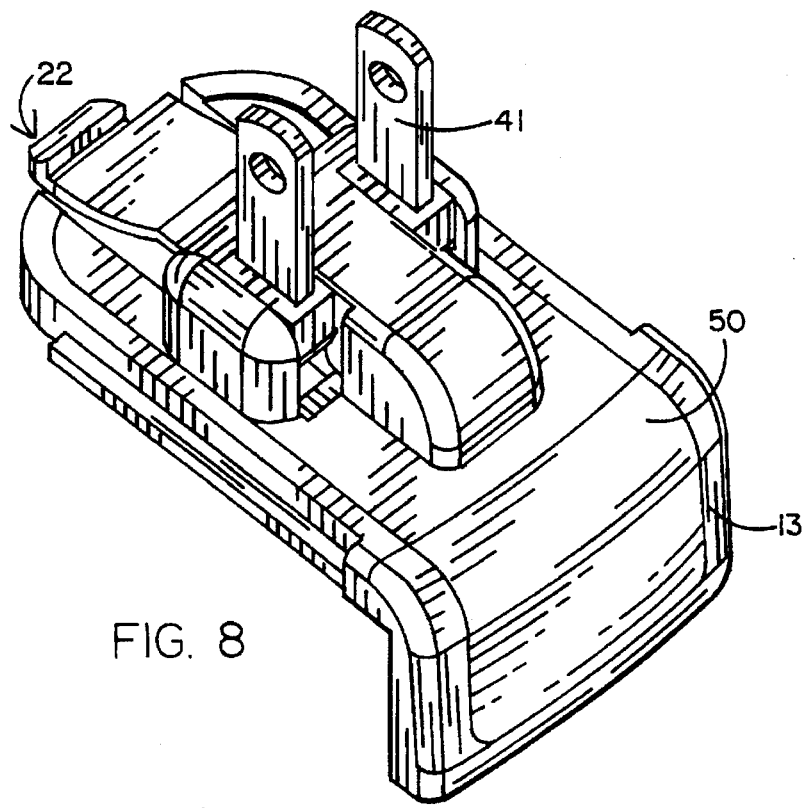
FIG. 8 provides an isometric view of an interchangeable plug including the collapsible prong feature included in a preferred embodiment of the present invention.

FIG. 8 provides an isometric view of an interchangeable plug included in the present invention and including a collapsible prong in the extended position.

Thus, a preferred embodiment of the present invention incorporates a collapsible prong into an interchangeable plug incorporating a submerged pin and sleeve electrical connection. With this combination, the present invention provides, in part, an improved apparatus and method for deriving electrical current from an outlet meeting any national or international standard, while providing the increased safety and convenience of an easily stored and transported device.

Figure 9:
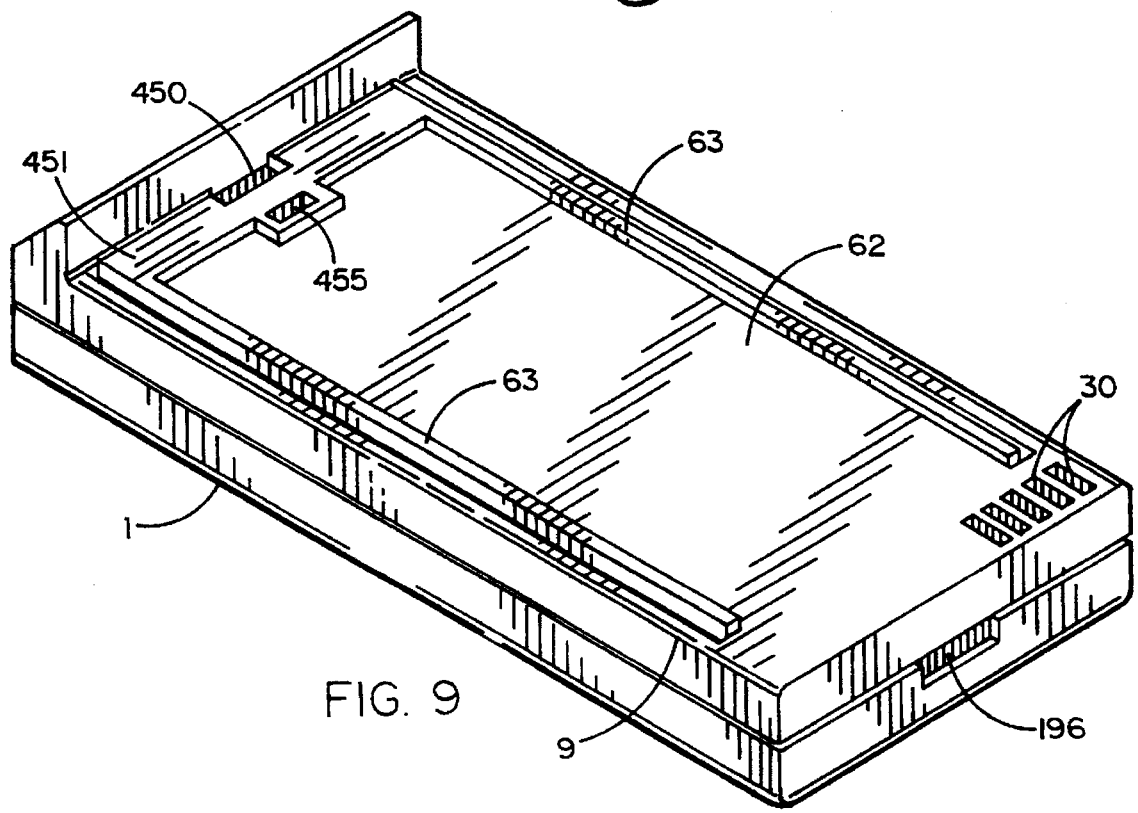
FIG. 9 provides a side perspective view of the charger unit incorporated into the present invention.
Figure 10A:
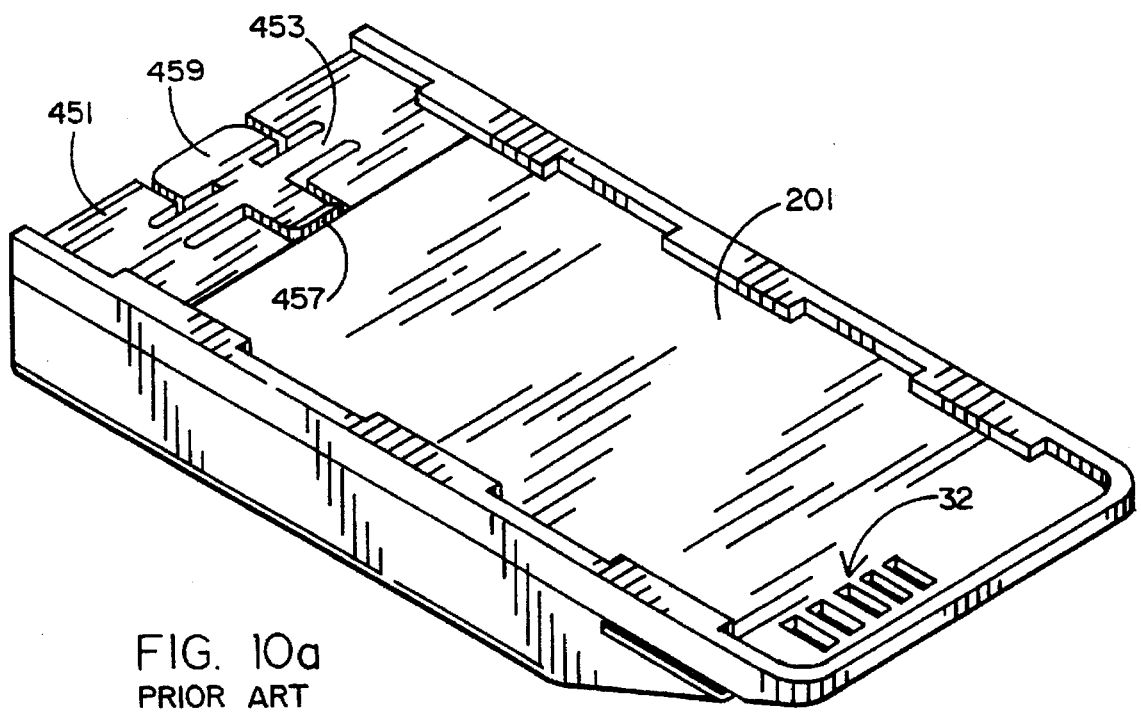

In a preferred embodiment, casing 1 incorporates a cradle or battery holder, as illustrated in FIG. 9. Referring to FIG. 9, bottom 9 of casing 1 includes cradle 62, with guide tabs 63 and cradle electrical contacts 30. Generally, the cradle mechanism is designed to simulate the battery securing mechanism on any electrical device such as a compact cellular telephone or portable computer, and to be fully compatible with the battery locking mechanism used in these devices. Many other mechanisms known to the skilled artisan for securing a battery to a cradle are compatible with and included in the present invention. Battery 209, shown in FIGS. 10A, 10B and 10C, has grooves 65 to slidably engage guide tabs 63 and includes battery electrical contacts 32 to come into electrical communication with cradle electrical contacts 30.

One skilled in the art can select one of several ways for battery 209 to be secured in cradle 62 by gravity, friction, or, preferably, by the locking mechanism compatible with the locking mechanism incorporated into battery 209. To release the battery from cradle 62 and guide tabs 63, the user pushes tab 459 toward cradle 62, causing a lower portion of locking member 457 to pull away from cradle 63 and locking detent 455 therein. Fulcrum 453 provides the necessary counter point to withdraw the locking member from the detent. Gap 450 in battery 209 accommodates an upper portion of locking member 457 when tab 459 is pushed toward cradle 62.

Because locking member 457 is positively biased in the locked position, sliding battery 209 along guide tabs 63 to stopping member 451 causes locking detent 455 to engage the lower portion of locking member 457 when upper edge 458 of battery 209 nears the stopping member 451. The battery can thus be electrically and mechanically secured to the cradle and charger. Power supply 7 can be connected to cradle electrical contacts 30 to provide power for battery 209. An electronic device can be simultaneously connected to power supply 7 via output receptacle 196. If desired, the inventive device could include a plurality of output receptacles 196 to power a plurality of devices, such as a notebook computer and an attached portable printer unit.

Figure 10B:
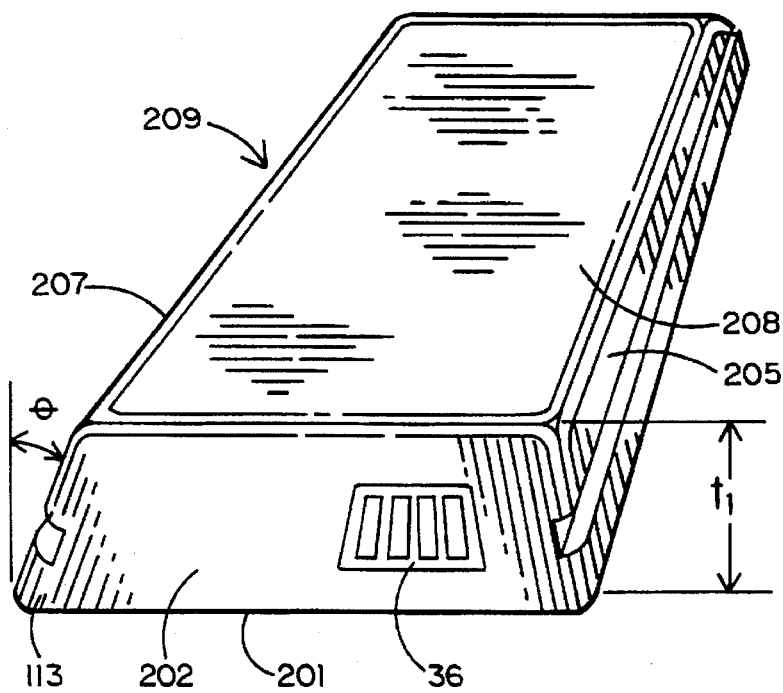

Referring now to FIGS. 10B and 10C, which are single point perspective views of small and large size battery housings respectively which were disclosed in U.S. Pat. No. 5,059,885 to Weiss, et al. It can be observed that the shape of the battery housings are essentially trapezoidal prisms. The bottom surfaces 201 of the battery housings shown in FIGS. 10B and 10C are surfaces which mate against the aforementioned cradle 62 or a cellular telephone during operation. The sides 205 and 207 of the battery housing 209 slope inward at an angle θ relative to a line perpendicular to surface 201. The difference in size between the small size battery of FIG. 10B and the large size battery of FIG. 10C is primarily a difference in the distance from the surface 201 to the top surface 208 of battery housing 209. The apparatus of the present invention is therefore so arranged as to accommodate both physical and electrical connections to batteries of varying thicknesses.

FIG. 11 shows the battery and cradle in relation to one another immediately before or after connection.

Alternative embodiments of cradle 62 are shown in FIGS. 12–16. In a first alternative embodiment, cradle 90 is designed to accommodate an alternative battery housing 309, similar to battery housing 209 in function but distinct in form, and therefore incorporates a distinct locking mechanism. The top end of cradle 90 includes securing protrusion 480 for frictionally and releasably engaging battery housing 209 at upper end 311. Rotatably closable contact platform 580, including spring-loaded electrical contacts 582, is positioned at the bottom of cradle 90 to releasably engage the electrical contacts (not shown) of battery 309. When the charging device is being stored or is otherwise not in use, platform 580 can be rotated into a non-operative position, flush with bottom surface 9 of casing 1. The user may then pull platform 580 back to its operative position by pulling on detent 584. In a manner known in the art, spring-loaded electrical contacts 582 are in electrical communication with power supply 7 via a flexible connecting means (not shown).

FIG. 13 provides a partial cutaway view of battery housing 309 in place upon platform 580. FIG. 14 provides a profile view of battery housing 309 upon platform 580, and pivotally moved to position 309' away from cradle 62, and ready to be pulled away from platform 580.

If desired, either securing protrusion 480 or platform 580 could be movably attached to casing 1 in such a manner as to allow a decrease in the distance 450 between their closest surfaces, thereby allowing for batteries having shorter height than battery housing 309, and thereby accommodating and anticipating advances in the art of battery miniaturization.

Figure 17:
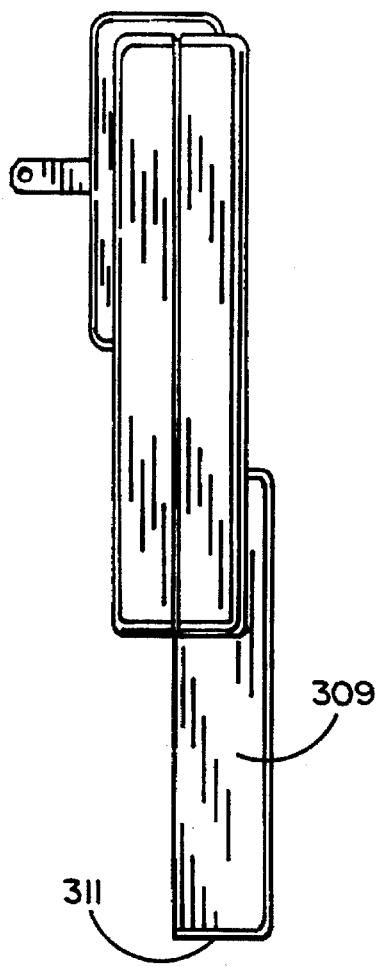
FIG. 17 provides a side view of the features shown in FIG. 15, including battery engaged in the inventive cradle.
Figure 18:
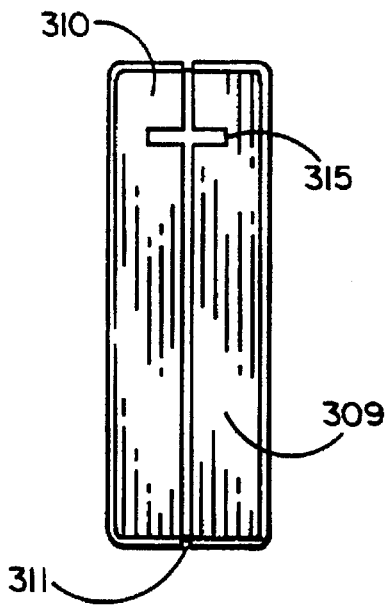
FIG. 18 provides a view of the battery catch mechanism with which the inventive cradle shown in FIG. 16 is compatible.

Yet another alternative embodiment of the present invention is shown in FIGS. 15–17, wherein battery housing 309 slidably fits and is secured within battery holding slot 80. Battery housing 309, having ends 310 and 311, slides into slot 80 with end 310 and battery electrical contacts attached thereto, facing up toward charger electrical contacts 52. As shown in FIG. 16, flexible latch 82 releasably engages detent 315 in battery housing 309, shown in FIG. 18. Latch 82 is preferably designed to release detent 315 and battery housing 309 upon the application of a sufficient pulling force on battery housing 309 away from casing 1. Preferably, no additional latch hardware is required to release housing 309. However, other mechanisms for releasably engaging housing 309 within slot 80 fall within the scope of the present invention.

Figure 19A:
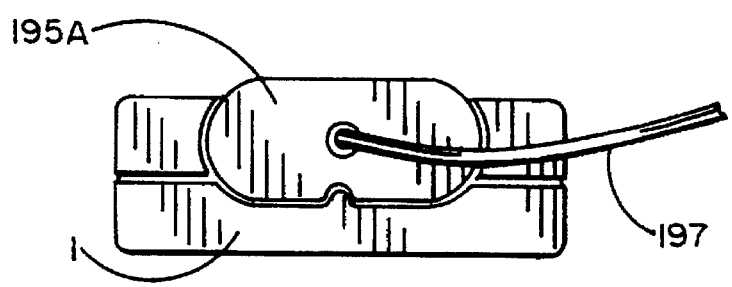
FIG. 19A provides a bottom view of the features shown in FIG. 17.
Figure 19B:
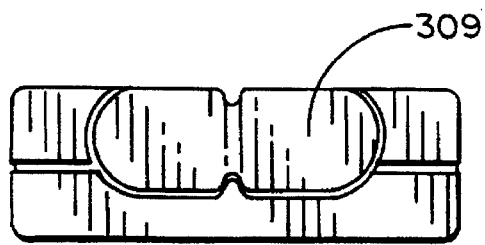
FIG. 19B provides a bottom view of an alternate use for the inventive device shown in FIG. 17.
Figure 20:
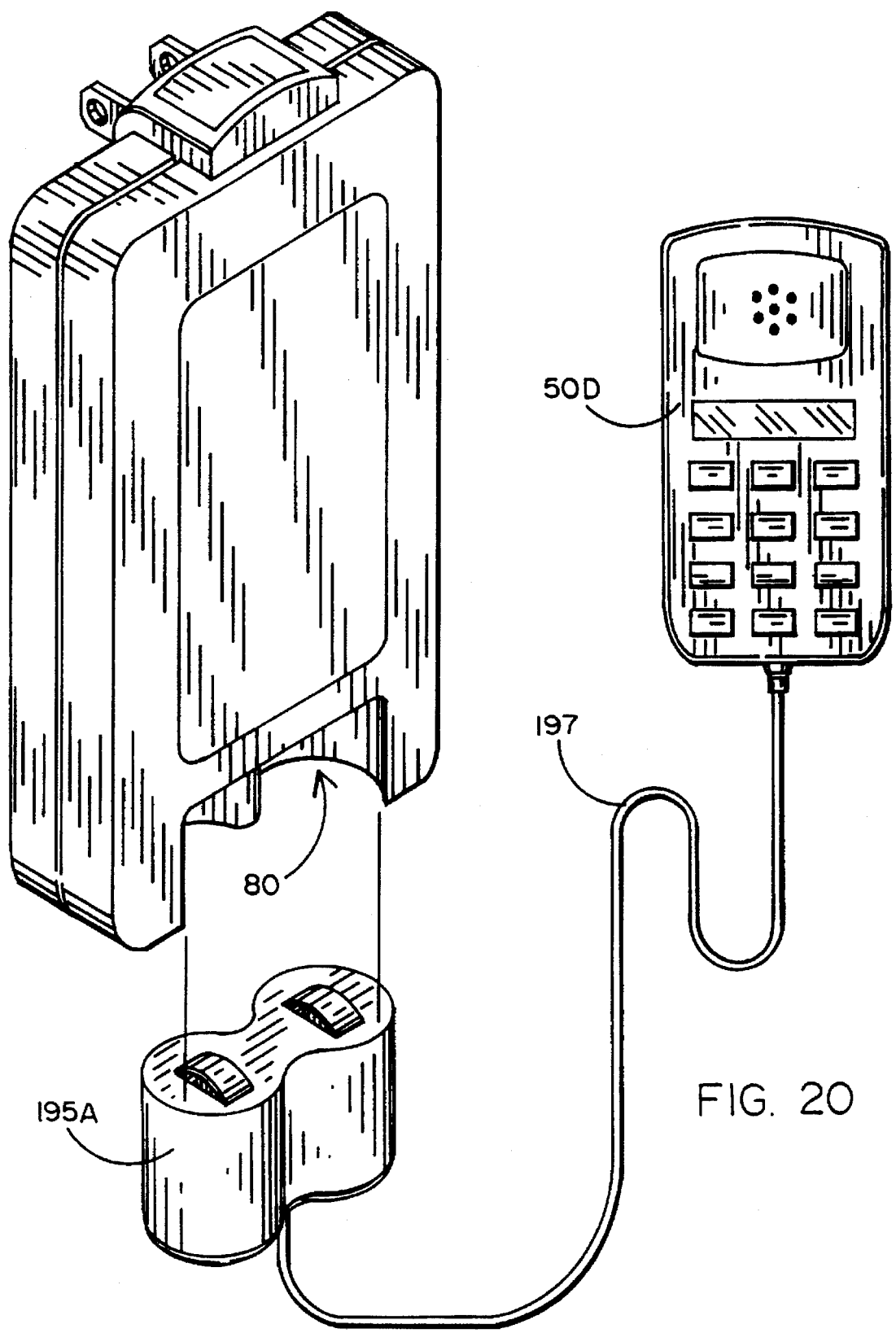
FIG. 20 illustrates the inventive device in use as a power supply, incorporating the inventive adapter apparatus disclosed in FIG. 19B.

As explained hereinabove, the present invention is a highly utilitarian battery charger compatible with myriad battery designs and electricity source configurations. However, a preferred embodiment of the present invention can also function as a power supply to a cellular phone or other device, preferably while simultaneously configured as a battery charger. For example, although slot 80 shown in FIGS. 15–17 accommodates battery housing 309, slot 80 is also compatible with supply adapter 195A, shown in FIG. 19A, which slidably fits within slot 80 and engages electrical contacts 52 therein. Supply adapter 195 is preferably shaped in a manner similar to that portion of battery housing 309 which fits within slot 80, as shown in FIG. 19B. Thus, supply adapter 195A can engage electrical contacts 52 within slot 80 and forward power from power supply 7 to phone 500 (or any other compatible electronic device), shown in FIG. 20, to directly power the phone whether or not the phone is attached to a battery. Power adapter 199 is configured to slidably engage an input power receptacle (not shown) integrated into the body of the device to be powered.

Figures 21, 22:
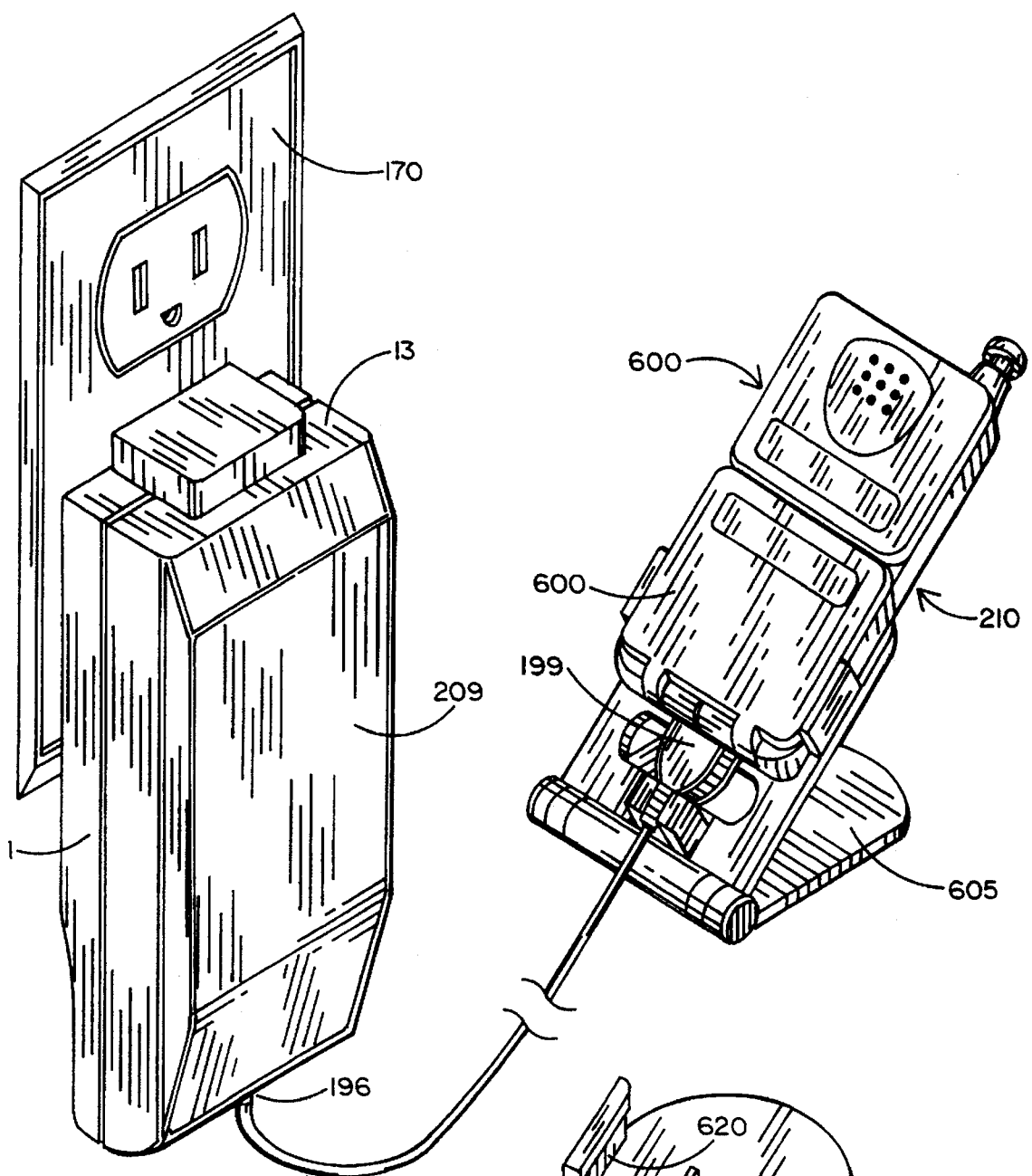
FIG. 21 illustrates an inventive method of use of the present invention.
FIG. 22 provides a close-up view of features shown in FIG. 21.

FIG. 21 illustrates a preferred embodiment of the present invention in use as both a power supply, supplying power from outlet 170 to cellular phone 600 (or any other compatible electronic device, such as a portable notebook computer) through interchangeable plug 13, power supply 7, output receptacle 196 and supply adapter 195 to cord 197 and phone power adapter 199. In a preferred embodiment, circuitry is included within casing 1 to selectably provide power to either phone 600 or battery 209. Preferably, phone 600 will receive power supply priority over battery 209 if either battery 210 is in need of a charge through phone 600 or phone 600 is activated and drawing current through power adapter 199. Otherwise, battery 209 will receive charging current as needed.

It should be noted here that batteries 209 and 210 are preferably, though not necessarily, identical. It is therefore axiomatic that the means for attaching battery 210 to phone 600 are very similar to the means disclosed above for attaching battery 209 to cradle 62.

If desired, phone 600 can be slidably mounted on collapsible phone stand 605. FIG. 22 provides a perspective view of phone stand 605 with phone 600 removed. Phone stand 605 includes hinge member 610, adapter guides 615 to removably secure power adaptor 199 in place, and casing guides 620 to engage phone 600 through an input power receptacle in the phone. Adapter 199 is preferably secured to phone stand 605 in such a manner as to be aligned and in electrical communication with the phone's input power receptacle when the phone is slidably mounted on the stand. Stand gaps 196 provide access to adapter 199 for the user's fingers to adjust adapter 199 in relation to an attached phone or detach the adapter from adapter guides 615 and phone 600 without tugging on cord 197. For those portable phones without the ability to charge an attached battery, phone stand 605 and adapter 199 provide backward compatibility in that adapter 199 can provide direct power to the attached battery through input contacts 36 shown in FIGS. 10B and 10C.

Figure 23:
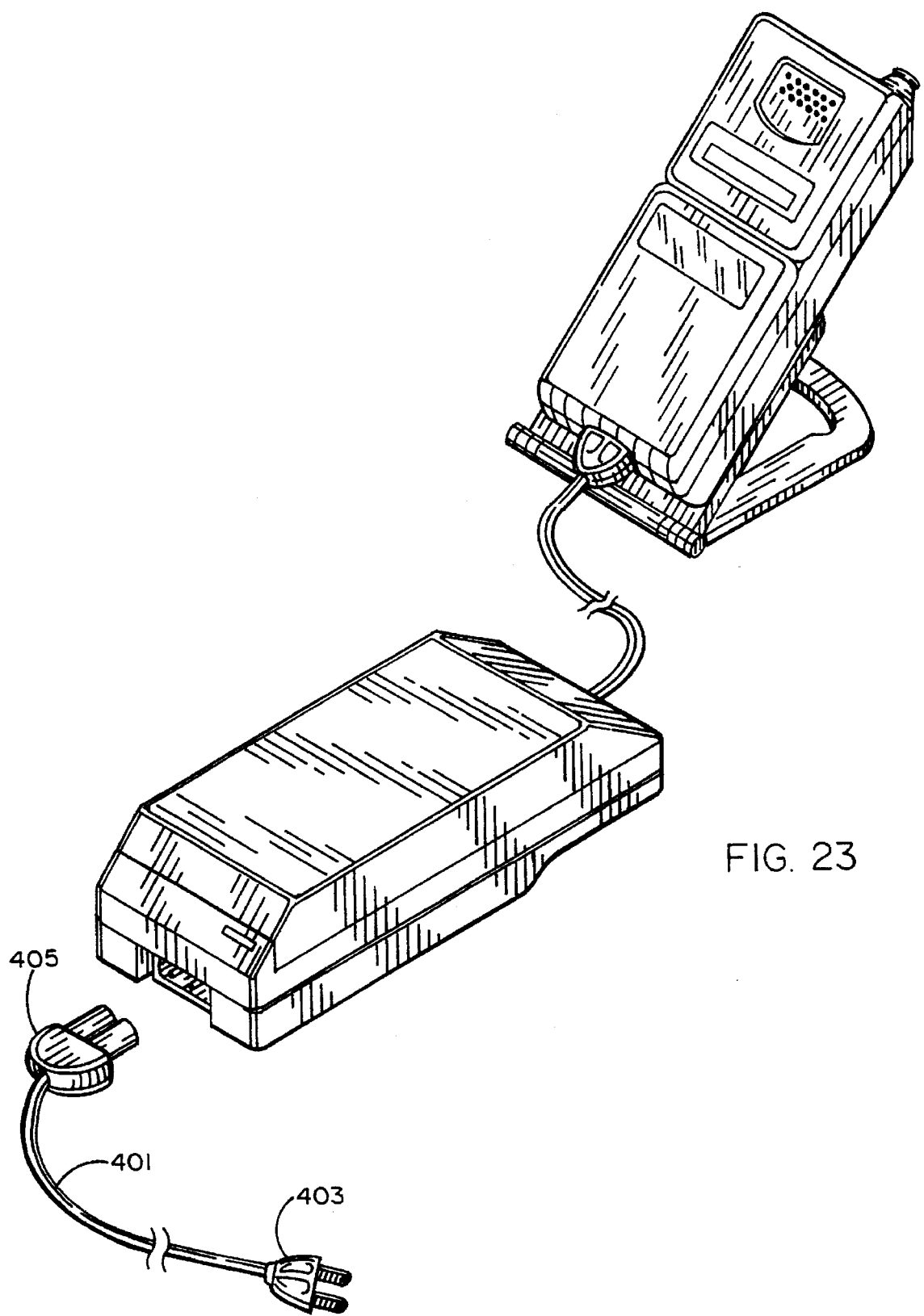
FIG. 23 illustrates a second inventive method of use of the present invention.
Figure 28A:
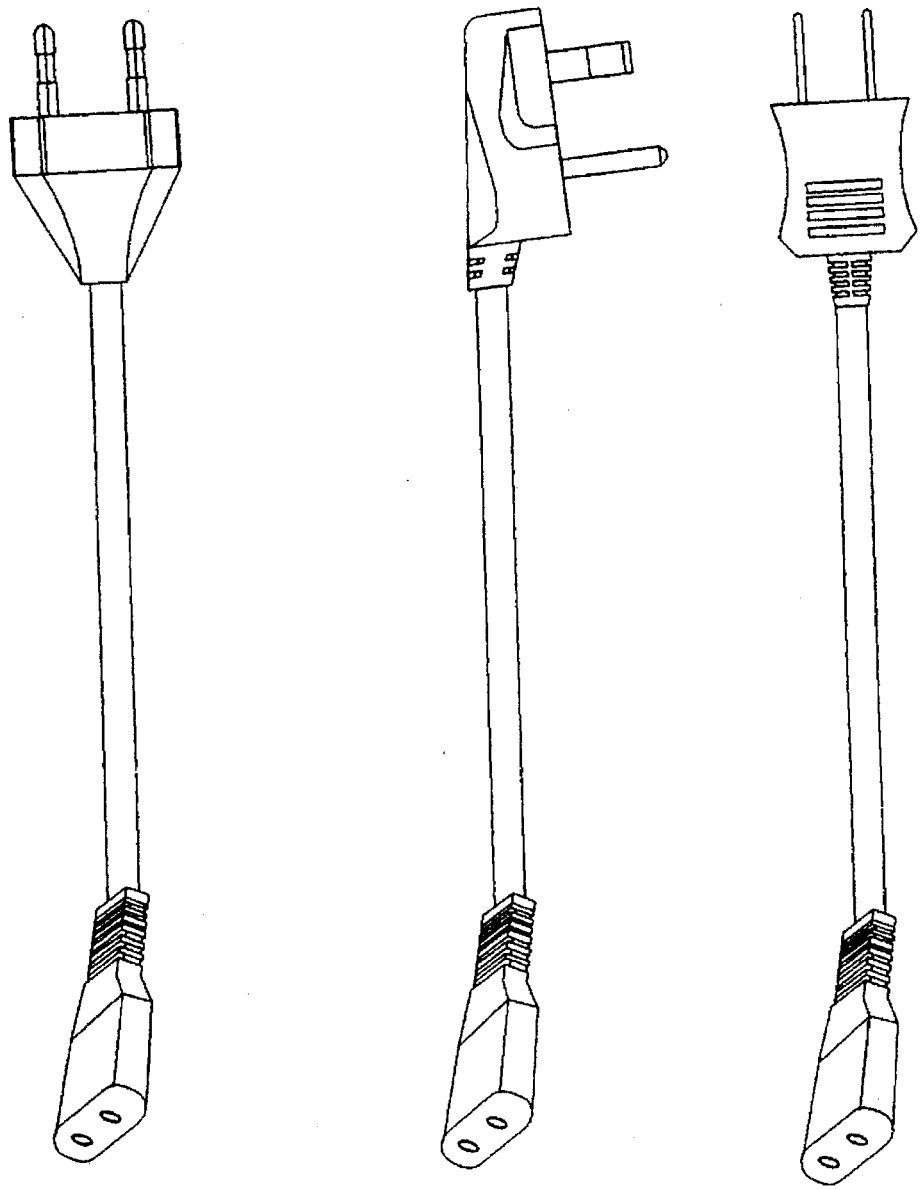
FIGS. 28A and 28B illustrate a variety of modular power cord devices compatible with the battery charger and power supply of the present invention.

FIG. 23 provides a view of the inventive device in use as a table-top battery charger and power supply for a cellular phone. In this view, interchangeable plug carrier 13 is removed from casing 1 and power is derived from an outlet through modular power cord 401, including plug 403 and universal power connector 405. Connector 405 is functionally identical to the connector contained on interchangeable plug carrier 13, including conducting sleeve 16. Connector 405 is therefore compatible with opening 3 and conducting pin 25 within casing 1, shown in FIG. 1A. If needed, additional modular power cords, shown in FIG. 28A, can be used in conjunction with the present invention. The ability to use modular power cords allows the device to retain the worldwide physical and electrical compatibility with varying outlet configurations, even if the outlet to be used is placed in a difficult to reach area wherein it may be impossible to utilize the interchangeable plugs disclosed above. Modular power cords are also advantageous for use with power outlet strips, thereby allowing the user to avoid blocking other unused outlets with the casing while still making the critical electrical connection.

Figure 24:
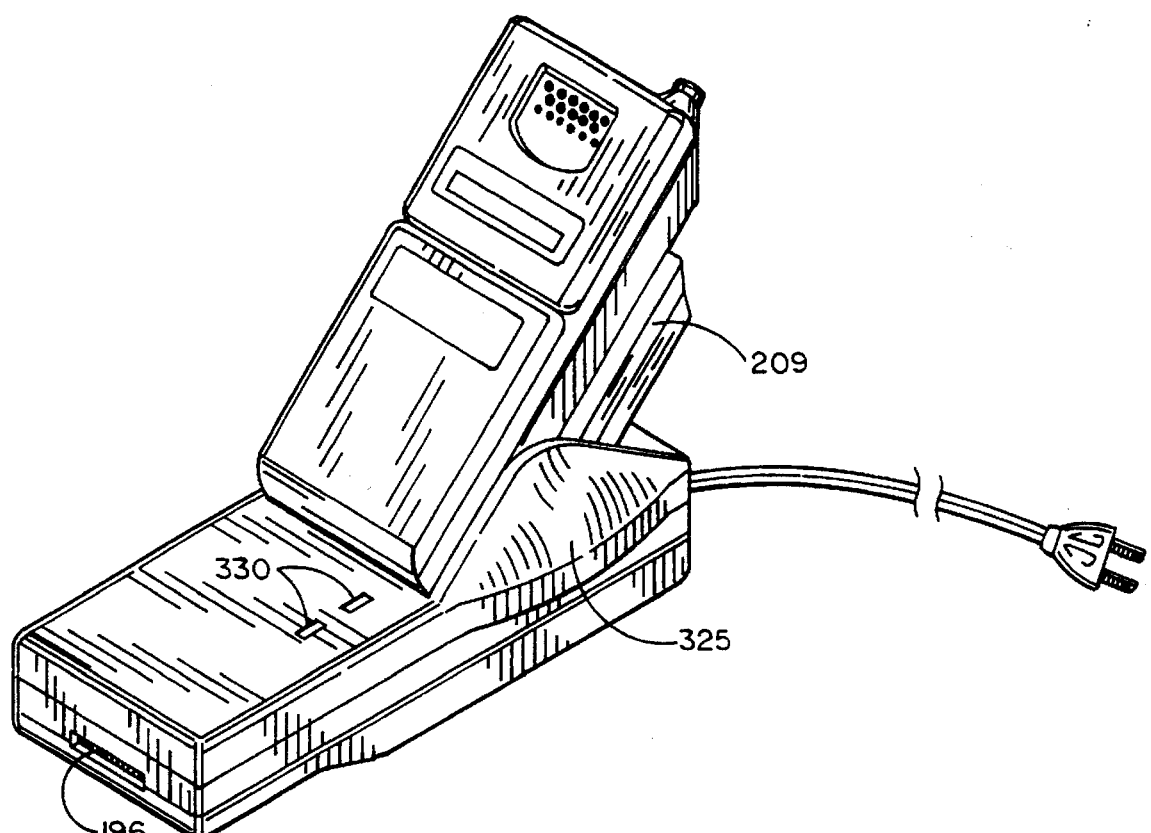
FIG. 24 is an isometric view of a dual-use charger stand embodiment of the invention.
Figure 25:
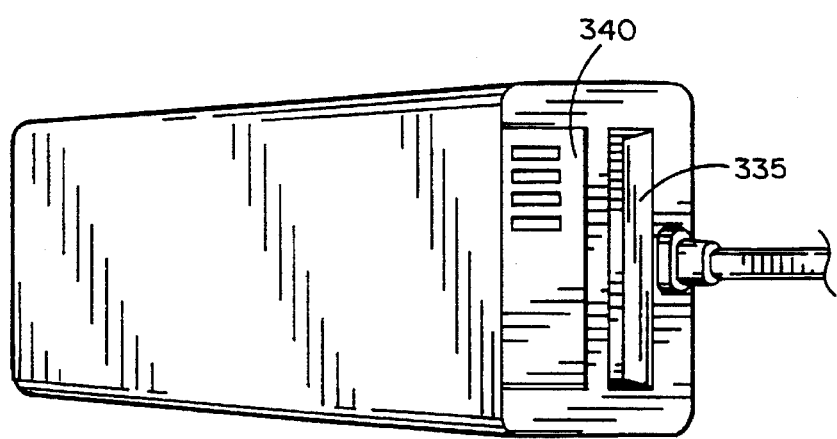
FIG. 25 provides a close-up view of the inventive battery charger and power supply including features utilized in the method of use disclosed in FIG. 23.
Figure 26:
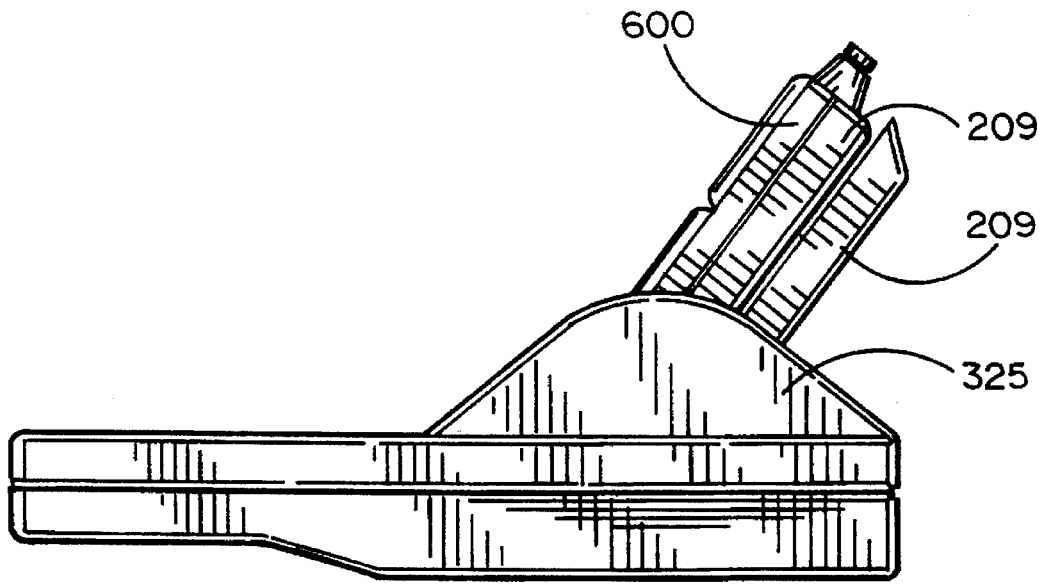
FIG. 26 shows a side elevation of the shown in FIG. 24.

FIGS. 24–26 illustrate the ability of the present invention to accommodate the user who wishes to maintain the familiar integrated dual-use charger available in the marketplace. Isometric view 24 shows detachable dual-use stand 325 operatively connected to casing 1. Phone 600, integrally connected with a first battery 209, and a second battery 209 are both in place on stand 325. Indicator lights 330 notify the user if either slot 335 or 340 is in use and drawing current. Stand 325 preferably attaches to casing 1 in the same manner illustrated above with reference to FIGS. 9–11. Contacts within slots 335 and 340 provide electrical communication for power supply 7 with external battery contacts 36 shown in FIGS. 10B and 10C.

Figure 28B:
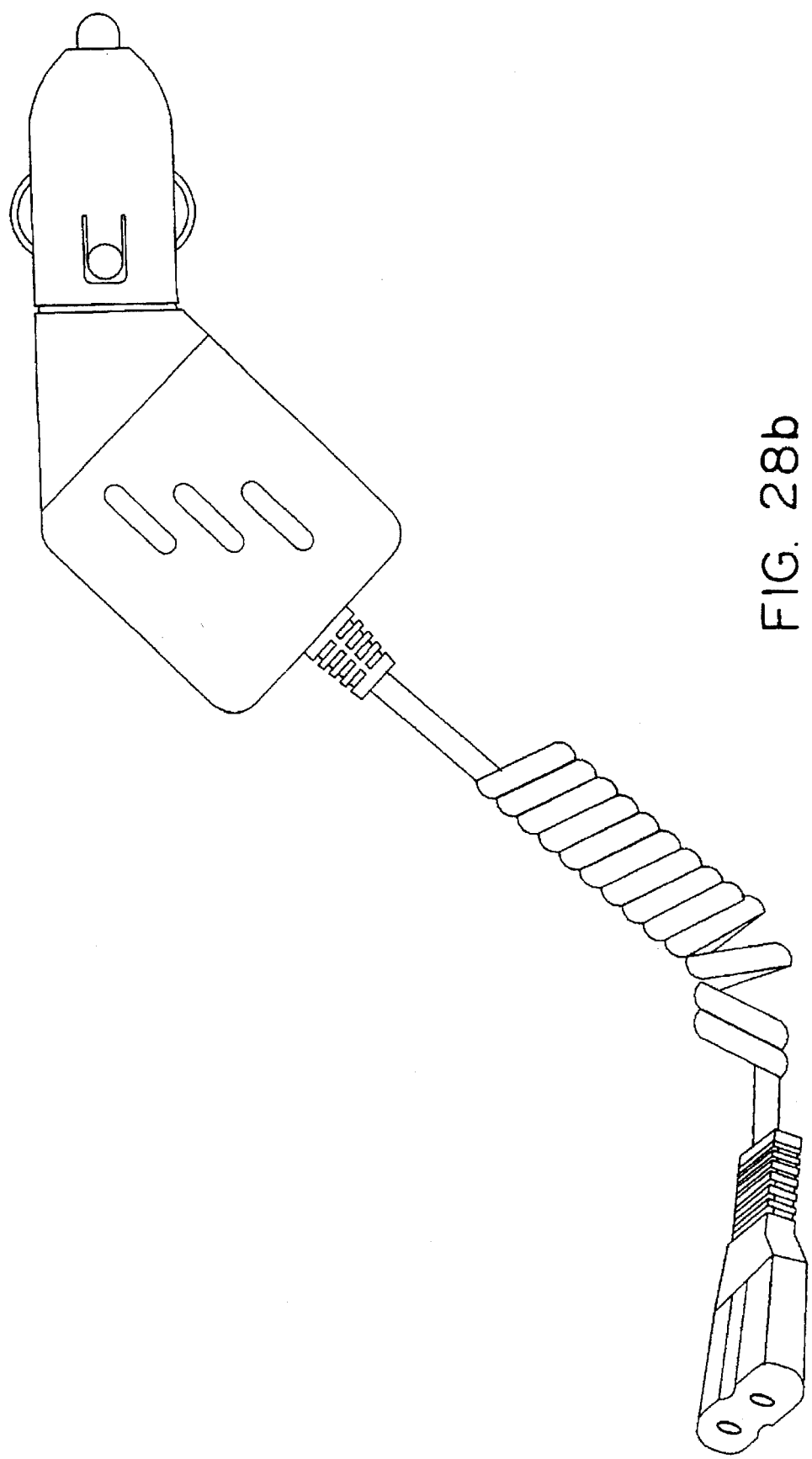

Moreover, a preferred embodiment of the present invention is designed for convenient, safe and reliable use in a truly mobile environment, such as a car or boat, wherein the electrical power source is dc and there is a high likelihood of shaking and instability. To this end, a cigarette lighter adapter (CLA) 404, shown in FIG. 28B, can be used in conjunction with all above-listed embodiments of the present invention when attached to power cord 401 and universal connector 405. Preferably, CLA 404 includes an internal dc power supply for stepping up the nominal supply voltage to the voltage required by power supply 7. Moreover, CLA 404 preferably also includes the features of an improved CLA disclosed in copending U.S. patent application Ser. No. 08/414,208, filed on Mar. 30, 1995 on behalf of Stan S. Hahn and assigned to the assignee of the present invention, entitled "Cigarette Lighter Adapter with Flexible Diameter" and incorporated by reference herein in its entirety.

Figure 27:
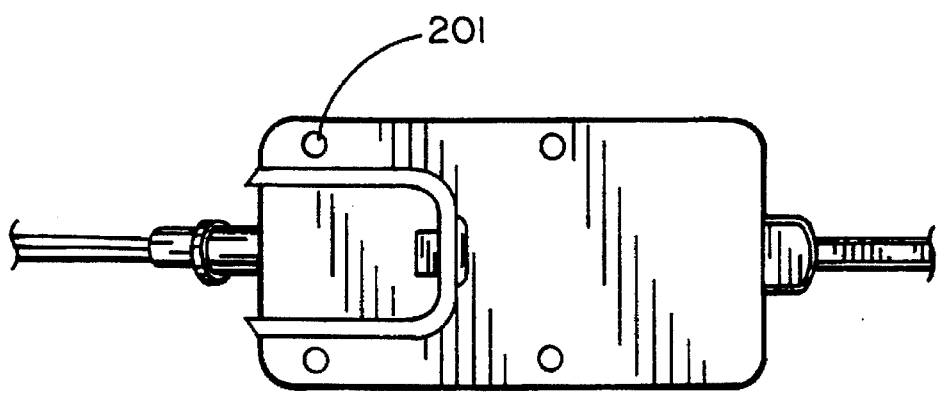
FIG. 27 provides a view of an embodiment of the present invention suitable for resting on a planar surface.

Finally, to further ensure stability for the inventive unit when used in a truly mobile environment, rubber feet 201 or their equivalent, as shown in FIG. 27, can be incorporated onto one side of the unit to increase friction between the unit and the surface on which it is placed.

With this combination, the present invention provides an improved apparatus and method for deriving electrical current from an outlet meeting any national or international standard, forwarding electrical power to an electrical device or rechargeable battery or, significantly, both, all while providing the increased safety and convenience of an easily stored and transported device.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. An apparatus for both charging a battery and supplying power to an electrical device, said apparatus comprising:

an electrical circuit including power supply circuitry, a casing providing a housing for said electrical circuit, plug means for receiving and forwarding electrical current, including input and output ends, said input end connectable to a source of electrical current, said plug means capable of accommodating a plurality of distinct electrical current source physical configurations at said input end, current receiving means for detachably connecting said electrical circuit to said plug means output end, said plug means detachably mounted to said current receiving means via said output end, first current supplying means for detachably connecting said electrical circuit to a first electrical device, second current supplying means for detachably connecting said electrical circuit to a rechargeable battery, and fastening means integral with said casing, for releasably attaching the rechargeable battery to said casing and placing the rechargeable battery in electrical communication with said second current supplying means and said electrical circuit, wherein said first electrical device and said rechargeable battery may be simultaneously connected to said electrical circuit.

2. The apparatus of claim 1, wherein said electrical circuit selectively supplies electrical current to said first electrical device and said rechargeable battery.

3. The apparatus of claim 1, wherein said plug means input and output ends are integrated into a single plug means carrier.

4. The apparatus of claim 3, wherein said input end comprises a collapsible electrical prong.

5. The apparatus of claim 1, wherein said input end comprises a cigarette lighter adapter.

6. The apparatus of claim 1, wherein said electrical circuit selectively supplies electrical current to both said first and said second electrical devices.

7. The apparatus of claim 1, wherein said plug output end includes a recessed electrical contact therein for preventing inadvertent contact therewith when said output end is connected to the electrical current source.

8. The apparatus of claim 1, wherein said first current supplying means comprises a current output receptacle, a first adaptor connected to said output receptacle, a first power cord, and a second adaptor connected to said first electrical device.

9. The apparatus of claim 1, wherein said fastening means is contained within said second current supplying means.

10. The apparatus of claim 1, further comprising a housing for battery charging, said housing being connectable with said fastening means and including means for securing a plurality of electrical devices therein and means for placing said second current supplying means in electrical communication with said plurality of electrical devices.

* * * * *

UNITED STATES PATENT AND TRADEMARK OFFICE
CERTIFICATE OF CORRECTION

PATENT NO. : 5,648,712

DATED : July 15, 1997

INVENTOR(S) : Hahn

Page 1 of 2

It is certified that error appears in the above-indentified patent and that said Letters Patent is hereby corrected as shown below:

In column 1, line 30, delete "de" and insert therefor --dc--.

In column 3, line 24, delete "be-flexibly" and insert therefor --be flexibly--.

In column 4, line 65, delete "provide" and insert therefor --provides--.

In column 5, line 34, after "FIG. 26 shows a side elevation of the" insert --embodiment--.

In column 7, line 11, delete "copending".

In column 7, line 12, after "filed Feb. 24, 1994," insert --now abandoned,--.

In column 7, line 13, after "Apr. 26, 1994," insert --now abandoned,-- and after "filed Mar. 30, 1995," insert --and issued Jun. 3, 1997, as U.S. Patent No. 5,634,806,--.

UNITED STATES PATENT AND TRADEMARK OFFICE
CERTIFICATE OF CORRECTION

PATENT NO. : 5,648,712

DATED : July 15, 1997

INVENTOR(S) : Hahn

It is certified that error appears in the above-indentified patent and that said Letters Patent is hereby corrected as shown below:

In column 8, line 61, delete "housings respectively" and insert therefor --housings, respectively,--.

In column 11, line 24, delete "copending".

In column 11, line 25, after "filed on Mar. 30, 1995" insert --, and issued on May 6, 1997, as U.S. Patent No. 5,626,496,--.

Signed and Sealed this

Eleventh Day of November, 1997

Attest:

BRUCE LEHMAN

Attesting Officer         Commissioner of Patents and Trademarks